(12) United States Patent
Beech, Jr. et al.

(10) Patent No.: US 7,214,636 B2
(45) Date of Patent: May 8, 2007

(54) CATALYST REGENERATOR FOR REDUCING ENTRAINED CATALYST LOSS

(75) Inventors: James Harding Beech, Jr., Kingwood, TX (US); Richard E. Walter, Long Valley, NJ (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 501 days.

(21) Appl. No.: 10/646,240

(22) Filed: Aug. 22, 2003

(65) Prior Publication Data

US 2005/0043577 A1    Feb. 24, 2005

(51) Int. Cl.
    *B01J 20/34*  (2006.01)
(52) U.S. Cl. ...................................... 502/38
(58) Field of Classification Search .......... 502/20, 502/21, 34, 38
    See application file for complete search history.

(56) References Cited

U.S. PATENT DOCUMENTS

| | | | | |
|---|---|---|---|---|
| 2,420,542 A | | 5/1947 | Jahnig | 196/52 |
| 2,579,834 A | | 12/1951 | Kollgaard | 196/52 |
| 4,435,282 A | | 3/1984 | Bertolacini et al. | 208/113 |
| 4,477,335 A | * | 10/1984 | Benslay | 208/113 |
| 4,786,400 A | * | 11/1988 | Farnsworth | 208/80 |
| 4,786,622 A | * | 11/1988 | Walters et al. | 502/44 |
| 4,959,334 A | | 9/1990 | Mauleon et al. | 502/43 |
| 4,968,404 A | | 11/1990 | Chan et al. | 208/113 |
| 6,023,005 A | * | 2/2000 | Lattner et al. | 585/639 |
| 2003/0125598 A1 | | 7/2003 | Chisholm et al. | 585/640 |
| 2004/0024276 A1 | | 2/2004 | Smith et al. | |

FOREIGN PATENT DOCUMENTS

| | | |
|---|---|---|
| EP | 610 186 | 3/2000 |
| EP | 1 036 838 | 9/2000 |
| GB | 769818 | 3/1957 |
| GB | 849 929 | 9/1960 |
| GB | 1562571 | 3/1980 |
| WO | WO 99 55799 | 11/1999 |
| WO | WO 02/08359 | 1/2002 |
| WO | WO 2004/018092 | 3/2004 |

OTHER PUBLICATIONS

U.S. Appl. No. 10/124,859, filed Apr. 18, 2002, Ding et al.
U.S. Appl. No. 10/125,138, filed Apr. 18, 2002, Van Egmond et al.
U.S. Appl. No. 10/260,263, filed Sep. 30, 2002, Beech et al.
U.S. Appl. No. 10/338,604, filed Jan. 8, 2003, Lattner et al.
Adham, K., "Classify Particles Using Fluidized Beds," Fluids/Solids Handling, CEP Magazine, pp. 54-57, Sep. 2001.

* cited by examiner

*Primary Examiner*—Edward M. Johnson

(57) ABSTRACT

The present invention is directed to a swaged catalyst regenerator and processes for using the catalyst regenerator. In one embodiment, the swaged catalyst regenerator includes a regeneration zone having a first major diameter and into which a regeneration medium and an at least partially coked catalyst from a reactor can be fed. The catalyst regenerator also includes a separation zone having a second major diameter. The separation zone is provided to separate entrained catalyst from gaseous components, e.g., combustion products of a regeneration process, and return the entrained catalyst to the regeneration zone. The ratio of the second major diameter to the first major diameter is at least 1.1, 1.4, 1.7, 2.0, 2.3, 2.6 or 2.9. By providing a catalyst regenerator having these characteristics, desirable regeneration characteristics that minimize entrained catalyst loss can be achieved.

45 Claims, 3 Drawing Sheets

Fig. 2
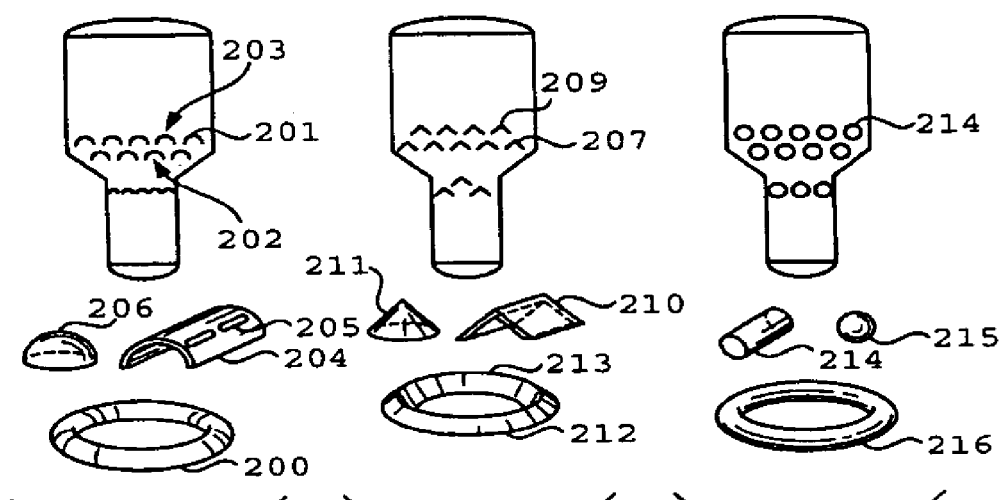
Fig. 2A   Fig. 2B   Fig. 2C
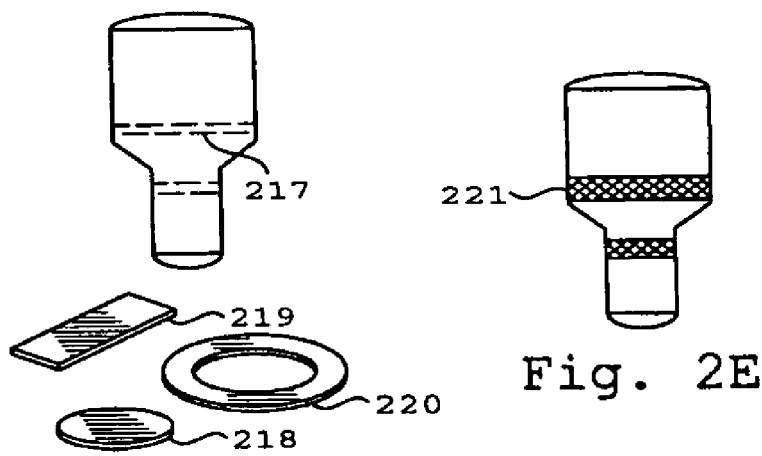
Fig. 2D

CATALYST REGENERATOR FOR REDUCING ENTRAINED CATALYST LOSS

FIELD OF THE INVENTION

This invention relates to a catalyst regenerator, and more particularly, to a catalyst regenerator capable of efficiently regenerating coked catalyst compositions while minimizing entrained catalyst loss.

BACKGROUND OF THE INVENTION

Light olefins, defined herein as ethylene and propylene, serve as feeds for the production of numerous chemicals. Olefins traditionally are produced by petroleum cracking. Because of the limited supply and/or the high cost of petroleum sources, the cost of producing olefins from petroleum sources has increased steadily.

Alternative feedstocks for the production of light olefins are oxygenates, such as alcohols, particularly methanol, dimethyl ether, and ethanol. Alcohols may be produced by fermentation, or from synthesis gas derived from natural gas, petroleum liquids, carbonaceous materials, including coal, recycled plastics, municipal wastes, or any organic material. Because of the wide variety of sources, alcohol, alcohol derivatives, and other oxygenates have promise as an economical, non-petroleum source for olefin production.

The catalysts used to promote the conversion of oxygenates to olefins are molecular sieve catalysts. Because ethylene and propylene are the most sought after products of such a reaction, research has focused on what catalysts are most selective to ethylene and/or propylene, and on methods for increasing the life and selectivity of the catalysts to ethylene and/or propylene.

The conversion of oxygenates to olefins (OTO), particularly the conversion of methanol to olefins (MTO), in a hydrocarbon conversion apparatus generates and deposits carbonaceous material (coke) on the molecular sieve catalysts used to catalyze the conversion process. Excessive accumulation of these carbonaceous deposits will interfere with the catalyst's ability to promote the reaction. In order to avoid unwanted build-up of coke on molecular sieve catalysts, the OTO and MTO processes incorporate a second step comprising catalyst regeneration. During regeneration, the coke is at least partially removed from the catalyst by combustion with oxygen, which restores the catalytic activity of the catalyst and forms a regenerated catalyst. The regenerated catalyst then may be reused to catalyze the conversion of methanol to olefins.

In conventional regeneration vessels, coked catalyst is directed from a reactor to a catalyst regenerator. In a catalyst regenerator, a regeneration medium, usually oxygen, enters the regenerator, and coke is removed from the coked catalyst by combustion with the regeneration medium to form regenerated catalyst and gaseous byproducts. The bulk of the regenerated catalyst from the regenerator is returned to the reactor. The gaseous byproducts are forced out an exhaust outlet oriented in the upper section of the catalyst regenerator. Undesirably, a significant amount of entrained catalyst from the regenerator is forced out the exhaust outlet with the gaseous byproducts. This loss of entrained catalyst from a catalyst regenerator results in increased costs, particularly on an industrial scale.

Many conventional regenerators operate in a fast-fluidized catalyst flow scheme. For example, Published PCT application WO 02/08359 A1 discloses a regenerator vessel, which in operation includes a fluidized bed zone of catalyst at its lower end. In the fluidized bed zone, a vertically extending partition, which partition is provided with one or more openings, is present dividing the fluidized bed zone in a dense phase fluidized bed zone and a fast-fluidised bed zone, the dense phase fluidized bed zone provided with the means to supply catalyst and the fast-fluidised bed zone provided with the means to supply an oxygenate gas at its lower end. The relatively high velocities in fast-fluidized regeneration schemes impart increased momentum to the catalyst particles contained in the system. As a result, entrained catalyst loss and catalyst attrition are even greater problems in fast-fluidized regeneration systems.

For a variety of reasons, molecular sieve catalyst compositions implemented in OTO and MTO reaction processes are particularly costly to manufacture and can be more than an order of magnitude higher in cost to manufacture than catalysts used in FCC systems. This increased cost is due to the increased costs associated with the individual components, e.g., molecular sieves, that are used to form the catalyst. For example, specialized templates typically are used to form molecular sieves used in OTO and MTO reaction systems. Additionally, the yield of acceptable catalyst formed in a catalyst formulation batch is lower for OTO catalyst than in FCC catalyst manufacture. As a result, entrained catalyst loss from catalyst regeneration is particularly a problem in OTO and MTO regeneration systems. It is therefore desirable to reduce the amount of entrained catalyst loss in an OTO or an MTO regeneration system.

SUMMARY OF THE INVENTION

This invention provides a novel catalyst regenerator for efficiently regenerating catalyst while reducing or eliminating entrained catalyst loss. The invention also provides processes for using the novel catalyst regenerator. The catalyst regenerator of the present invention is particularly well-suited for receiving and regenerating coked catalyst from an MTO reaction system, which utilizes expensive molecular sieve catalyst compositions.

In one embodiment, the invention is to a catalyst regenerator having certain design parameters that provide desirable catalyst superficial velocity characteristics. These superficial velocity characteristics reduce entrained catalyst loss. The catalyst regenerator preferably includes a regeneration zone into which a regeneration medium and an at least partially coked catalyst from a reactor can be fed. The regeneration zone has a first lower end, a first upper end and a first major length therebetween. The catalyst regenerator also includes a separation zone provided to separate entrained catalyst from gaseous components, e.g., combustion products of a regeneration process and optionally unreacted regeneration medium, and return the entrained catalyst to the regeneration zone. The separation zone has a second lower end, a second upper end and a second major length therebetween. The separation zone includes a swaged region adjacent the second lower end of the separation zone, and the second lower end is in fluid communication with the first upper end. The catalyst regenerator also includes a catalyst return into which regenerated catalyst can be fed from the regeneration zone and from which the regenerated catalyst can be directed to the reactor. According to one embodiment, the ratio of the second major length to the first major length is greater than 1.0, 1.25, 1.5, 2.0, 3.0, 4.0 or 5.0. By providing a catalyst regenerator having these characteristics, desirable regeneration characteristics that minimize entrained catalyst loss can be achieved.

Optionally, the regeneration zone has a first average diameter and the separation zone has a second average diameter. The ratio of the second average diameter to the first average diameter is at least about 1.1, at least 1.4, 1.7, 2.0, 2.3, 2.6 or 2.9. In terms of cross-sectional areas, the regeneration zone has a first average cross-sectional area and the separation zone has a second average cross-sectional area, and the ratio of the second average cross-sectional area to the first average cross-sectional area optionally is at least about 1.2, at least 2.0, 3.0, 4.0, 5.3, 6.8, or 8.5. These parameters are particularly well-suited for receiving at least partially coked catalyst from a methanol-to-olefin reactor.

In another embodiment, the present invention is directed to a process for regenerating catalyst. The process includes the steps of: (a) receiving a coked catalyst in a regeneration zone from a reactor; (b) contacting the coked catalyst with a regeneration medium in the regeneration zone at a first superficial velocity and under conditions effective to convert at least a portion of the coked catalyst to regenerated catalyst and forming gaseous products; (c) directing the gaseous products and entrained catalyst from the regeneration zone to a separation zone, wherein the entrained catalyst flows in the separation zone at a second superficial velocity; (d) separating a majority of the gaseous products in the separation zone from a majority of the entrained catalyst in the separation zone; (e) returning the majority of the entrained catalyst to the regeneration zone; and (f) directing the regenerated catalyst from the regeneration zone to the reactor, wherein the ratio of the first superficial velocity to the second superficial velocity is at least 1.2, at least 2.0, 3.0, 4.0, 5.3, 6.8, or 8.5. The second superficial velocity optionally is less than about 1.0 meters per second, less than 0.5, 0.25, or 0.1 meters per second.

In another embodiment, the present invention is directed to a process for regenerating catalyst, wherein the process comprises the steps of: (a) receiving a coked catalyst in a regeneration zone from a reactor; (b) contacting the coked catalyst with a regeneration medium in the regeneration zone at a first superficial velocity and under conditions effective to convert at least a portion of the coked catalyst to regenerated catalyst and forming gaseous products; (c) directing the gaseous products and entrained catalyst from the regeneration zone to a separation zone, wherein the entrained catalyst flows in the separation zone at a second superficial velocity, the second superficial velocity being less than the first superficial velocity; (d) separating a majority of the gaseous products in the separation zone from a majority of the entrained catalyst in the separation zone; (e) returning the majority of the entrained catalyst to the regeneration zone; (f) releasing a flue gas stream comprising the majority of the gaseous products from the separation zone, wherein the flue gas stream contains less than about 0.5, less than 0.05, or less than 0.005 weight percent entrained catalyst, based on the total weight of the flue gas stream; and (g) directing the regenerated catalyst from the regeneration zone to the reactor. Optionally, the ratio of the first superficial velocity to the second superficial velocity is at least 1.2, at least 2.0, 3.0, 4.0, 5.3, 6.8, or 8.5. The second superficial velocity preferably is less than about 1.0, 0.5, 0.25, or 0.1 meters per second. Preferably, the reactor is a methanol-to-olefin reactor, and the process includes the step of contacting methanol in the reactor with a molecular sieve catalyst under conditions effective to convert at least a portion of the methanol to light olefins and to form the coked catalyst.

BRIEF DESCRIPTION OF THE DRAWINGS

This invention will be better understood by reference to the Detailed Description of the Invention when taken together with the attached drawings, wherein:

FIG. 2A-E illustrates obstructing member configurations according to several embodiments of the present invention.

DETAILED DESCRIPTION OF THE INVENTION

Figure 1:
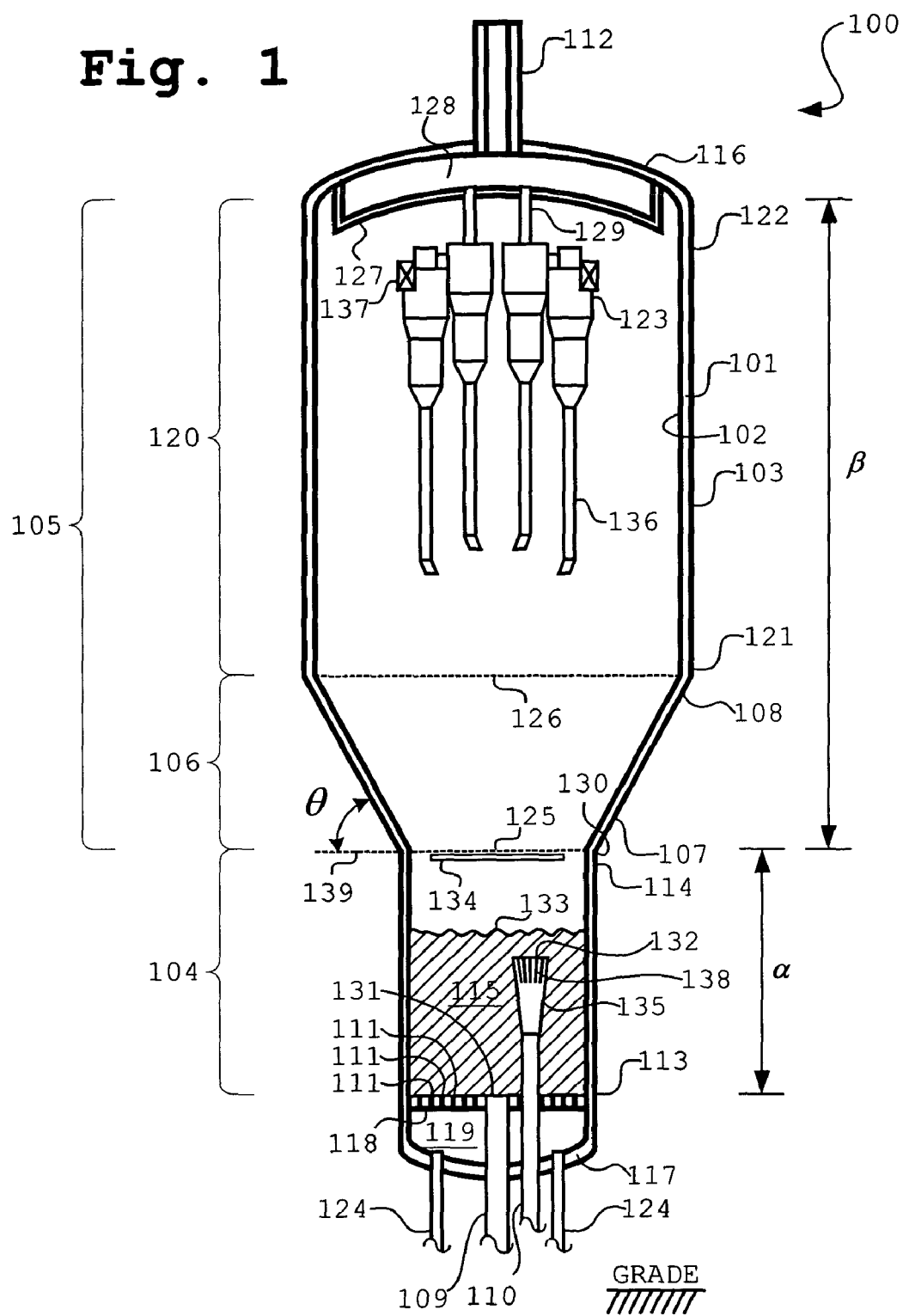
FIG. 1 illustrates a catalyst regenerator according to one embodiment of the present invention.

This invention provides a novel catalyst regenerator for efficiently regenerating catalyst while reducing or eliminating entrained catalyst loss. The invention also provides processes for using the novel catalyst regenerator. The catalyst regenerator of the present invention is particularly well-suited for receiving and regenerating coked catalyst from OTO reaction systems, which utilize highly valuable molecular sieve catalyst compositions.

During the catalytic conversion of hydrocarbons to various products, e.g., the catalytic conversion of oxygenates to light olefins (the OTO process), carbonaceous deposits accumulate on the catalyst used to promote the conversion reaction. At some point, the build up of these carbonaceous deposits causes a reduction in the capability of the catalyst to function efficiently. For example, in the OTO process, an excessively "coked" catalyst does not readily convert the oxygenate feed to light olefins. At this point, the catalyst is partially deactivated. When a catalyst can no longer convert the hydrocarbon to the desired product, the catalyst is considered to be fully deactivated. The catalyst regenerator of the present invention efficiently removes at least a portion of the carbonaceous deposits from an at least partially coked catalyst composition to form a regenerated catalyst composition having increased catalytic activity over the at least partially coked catalyst composition.

In accordance with the present invention, catalyst is withdrawn from a hydrocarbon conversion apparatus (HCA), e.g., a reactor or reaction unit, and is directed to a catalyst regenerator. Preferably, the HCA is an OTO reactor, and most preferably a methanol to olefin (MTO) reactor. The catalyst is partially, if not fully, regenerated in the catalyst regenerator. By regeneration, it is meant that the carbonaceous deposits are at least partially removed from the catalyst. Desirably, the catalyst withdrawn from the HCA is at least partially coked and, thus, at least partially deactivated. The remaining portion of catalyst in the HCA is re-circulated in the HCA without regeneration. The regenerated catalyst, with or without cooling, is then returned to the HCA.

Desirably, a portion of the catalyst, comprising molecular sieve and any other materials such as matrix materials, binders, fillers, etc., is removed from the HCA for regeneration and recirculation back to the HCA at a rate (catalyst weight/hour) of from about 0.05 times to about 1 times, more desirably from about 0.1 times to about 0.5 times, and most desirably from about 0.1 to about 0.3 times the total feed rate (oxygenate weight/hour) of oxygenates to the HCA. These rates pertain to the formulated molecular sieve catalyst composition, including non-reactive solids.

Desirably, the catalyst regeneration is carried out in a catalyst regenerator in the presence of a regeneration medium, typically a gas, comprising molecular oxygen or other oxidants. Examples of other oxidants include, but are not necessarily limited to, singlet $O_2$, $O_3$, $SO_3$, $N_2O$, NO, $NO_2$, $N_2O_5$, and mixtures thereof. Air and air diluted with nitrogen or $CO_2$ are particularly desirable regeneration mediums. The oxygen concentration in air can be reduced to a controlled level to minimize overheating of, or creating hot spots in, the catalyst regenerator. The catalyst can also be regenerated reductively with hydrogen, mixtures of hydrogen and carbon monoxide, or other suitable reducing gases.

The catalyst can be regenerated in any number of methods, such as batch, continuous, semi-continuous, or a combination thereof. Continuous catalyst regeneration is a desired method. Desirably, the catalyst is regenerated to a level of remaining coke from about 0.01 weight percent to about 15 weight percent, more preferably from about 0.01 to about 5 weight percent, based on the total weight of the regenerated catalyst composition.

The catalyst regeneration temperature should be from about 250° C. to about 750° C., and optionally from about 500° C. to about 700° C. Preferably the contacting of the coked catalyst with the regeneration medium in the regeneration zone occurs at a temperature of at least about 538° C., at least 649° C., or at least 710° C. Because the regeneration reaction preferably takes place at a temperature considerably higher than the OTO conversion reaction, e.g., about 93° C. to about 150° C. higher, it is desirable to cool at least a portion of the regenerated catalyst to a lower temperature before it is sent back to the HCA. One or more catalyst coolers, preferably located externally to the catalyst regenerator, optionally are used to remove heat from the regenerated catalyst after it has been withdrawn from the catalyst regenerator. When the regenerated catalyst is cooled, it is optionally cooled to a temperature that is from about 70° C. higher to about 80° C. cooler than the temperature of the catalyst withdrawn from the HCA. This cooled catalyst is then returned to either some portion of the HCA, the catalyst regenerator, or both. When the regenerated catalyst from the catalyst regenerator is returned to the HCA, it can be returned to any portion of the HCA. For example, the catalyst can be returned to a catalyst containment area to await contact with the feed, a separation zone to contact products of the feed or a combination of both.

Ideally, regeneration occurs in the catalyst regenerator at a pressure of from about 5 psig (34.5 kPag) to about 50 psig (345 kPag), preferably from about 15 psig (103 kPag) to about 40 psig (276 kPag), and most preferably from about 20 psig (138 kPag) to about 30 psig (207 kPag). The precise regeneration pressure is dictated by the pressure in the HCA. Higher pressures are generally preferred for lowering equipment size and catalyst inventory, however, higher pressures increase air blower power and cost.

Desirably, catalyst regeneration is carried out after the at least partially deactivated catalyst has been stripped of most of the readily removable organic materials (organics), e.g., interstitial hydrocarbons, in a stripper or stripping chamber. This stripping can be achieved by passing a stripping medium, e.g., a stripping gas, over the spent catalyst at an elevated temperature. Gases suitable for stripping include steam, nitrogen, helium, argon, methane, $CO_2$, CO, hydrogen, and mixtures thereof. A preferred gas is steam. The gas hourly space velocity (GHSV) of the stripping gas, based on volume of gas to volume of catalyst and coke, is from about 0.1 hr-1 to about 20,000 hr-1. Acceptable temperatures of stripping are from about 250° C. to about 750° C., and desirably from about 400° C. to about 600° C. Acceptable stripping pressures are from about 5 psig (34.5 kPag) to about 50 psig (344 kPag), more preferably from about 10 psig (69.0 kPag) to about 30 psig (207 kPag), and most preferably from about 20 psig (138 kPag) to about 25 psig (172 kPag). The stripping pressure is largely dependent upon the pressure in the HCA and in the catalyst regenerator.

The catalyst regenerator of the present invention includes a regeneration zone and a separation zone. In the regeneration zone, the at least partially coked catalyst contacts the regeneration medium, preferably as a turbulent dense bed or phase, under conditions effective, e.g., temperature and pressure, to at least partially regenerate the at least partially coked catalyst. Specifically, the conditions preferably are effective to convert the at least partially coked catalyst and the regeneration medium to regenerated catalyst and gaseous byproducts of the regeneration process. The regenerated catalyst may be fully or partially regenerated. The gaseous byproducts, optionally with entrained catalyst and/or unreacted regeneration medium, exit the dense phase and form a dilute phase, which extends from the surface of the dense phase to the top of the separation zone. The separation zone is adapted to separate the entrained catalyst from the gaseous components in the dilute phase, and return the entrained catalyst to the regeneration zone.

The dense phase density will depend on the solids particle density and the superficial gas velocity. Preferably, the density of the dense phase will range from about 10 lb/ft3 (160.2 kg/m3) to about 50 lb/ft3 (800.9 kg/m3), preferably from about 15 lb/ft3 (240.3 kg/m3) to about 35 lb/ft3 (560.6 kg/m3) and most preferably from about 20 lb/ft3 (320.4 kg/m3) to about 30 lb/ft3 (480.6 kg/m3). The superficial velocity in the dense phase optionally is no greater than 5 ft/sec (1.5 m/s), no greater than 4 ft/sec (1.22 m/s), no greater than 2 ft/sec (0.61 m/s), no greater than 1 ft/sec (0.30 m/s) or no greater than 0.5 ft/sec (0.15 m/s). Velocities much higher than 4 ft/sec (1.22 m/s) will result in a transition from a turbulent dense bed to a circulating fast fluid bed. In terms of lower range limits, the superficial velocity of the dense phase optionally is at least 0.1 ft/sec (0.03 m/s), at least 0.25 ft/sec (0.08 m/s), at least 0.5 ft/sec (0.15 m/s), or at least 0.75 ft/sec (0.23 m/s). Preferably, however, the superficial velocity in the dense phase ranges from 1.5 ft/sec (0.46 m/s) to 4.5 ft/sec (1.37 m/s), from 2.0 ft/sec (0.61 m/s) to 4.0 ft/sec (1.22 m/s), or from 2.5 ft/sec (0.76 m/s) to 3.5 ft/sec (1.07 m/s).

The regeneration zone includes one or more catalyst inlets for receiving an at least partially coked catalyst from a hydrocarbon conversion apparatus (HCA), typically a reactor or reaction unit. In one embodiment, the at least partially coked catalyst is transported in a catalyst supply conduit, e.g., a tubular member, from the HCA or an intermediate vessel, e.g., a catalyst stripper, to the regenerator. In the catalyst supply conduit, the catalyst preferably comes in contact with a fluidization agent under conditions effective to fluidize the catalyst contained therein. A non-limiting list of exemplary fluidization agents includes: steam, natural gas, nitrogen, argon, carbon dioxide or similar inert gases. The catalyst supply conduit receives the at least partially coked catalyst from the HCA or from an intermediate device such as a catalyst stripper and directs it to the catalyst regenerator. Thus, the catalyst supply conduit includes a first end in fluid communication with the HCA or intermediate device, and second end in fluid communication with the regeneration zone.

The catalyst supply conduit preferably enters the regeneration zone of the catalyst regenerator and releases the at least partially coked catalyst into the regeneration zone for carbonaceous deposit removal. The catalyst supply conduit optionally includes a plurality of second ends for evenly distributing the at least partially coked catalyst in the regeneration zone. In one preferred embodiment, the second end extends into the regeneration zone, preferably longitudinally with respect to the catalyst regenerator, and passes through a laterally extending distributor grid, described below. In this embodiment, the second end releases the at least partially coked catalyst composition into the regeneration zone at a position above the distributor grid. The bulk of the regeneration process preferably occurs in the dense phase of the regeneration zone. The dense phase optionally comprises from about 2 to about 45 volume percent, preferably from about 20 to about 35 percent of the regeneration zone, based on the total volume of the regeneration zone. On a weight basis, the dense phase preferably comprises from about 45 to about 98 percent, optionally from about 85 to about 95 percent, of the catalyst in the regeneration zone.

As used herein, longitudinal means extending in a direction perpendicular to grade, e.g., vertical, and lateral means extending in a direction parallel to grade, e.g., horizontal. The proximal end of the catalyst regenerator, or of a specified component thereof, is the portion of the catalyst regenerator or component which is nearest to grade, e.g., the bottom of the catalyst regenerator. The distal end of the catalyst regenerator, or of a specified component thereof, is the portion of the catalyst regenerator or component that is furthest removed from grade, e.g., the top of catalyst regenerator. Thus, "proximally facing" means longitudinally facing the proximal end.

The regeneration zone also preferably includes one or more regeneration medium inlets for receiving a regeneration medium, preferably air, molecular oxygen, or a mixture thereof. One or more regeneration medium conduits carry the regeneration medium from a regeneration medium source, such as a pressurized regeneration medium containment vessel in which the regeneration medium is stored, to the one or more regeneration medium inlets. In one embodiment, one or more nozzles introduce the regeneration medium into the regeneration zone. Preferably, the regeneration medium is introduced into the catalyst regenerator at a rate of about 50 to about 500 standard cubic feet (scf)/lb coke burned (about 3.1 to about 31.2 standard cubic meters (scm)/kg coke burned), more preferably from about 150 to about 400 scf/lb coke burned (about 9.4 to about 25.0 scm/kg coke burned), and most preferably from about 200 to about 350 scf/lb coke burned (about 12.5 to about 21.9 scm/kg coke burned).

Figure 3:
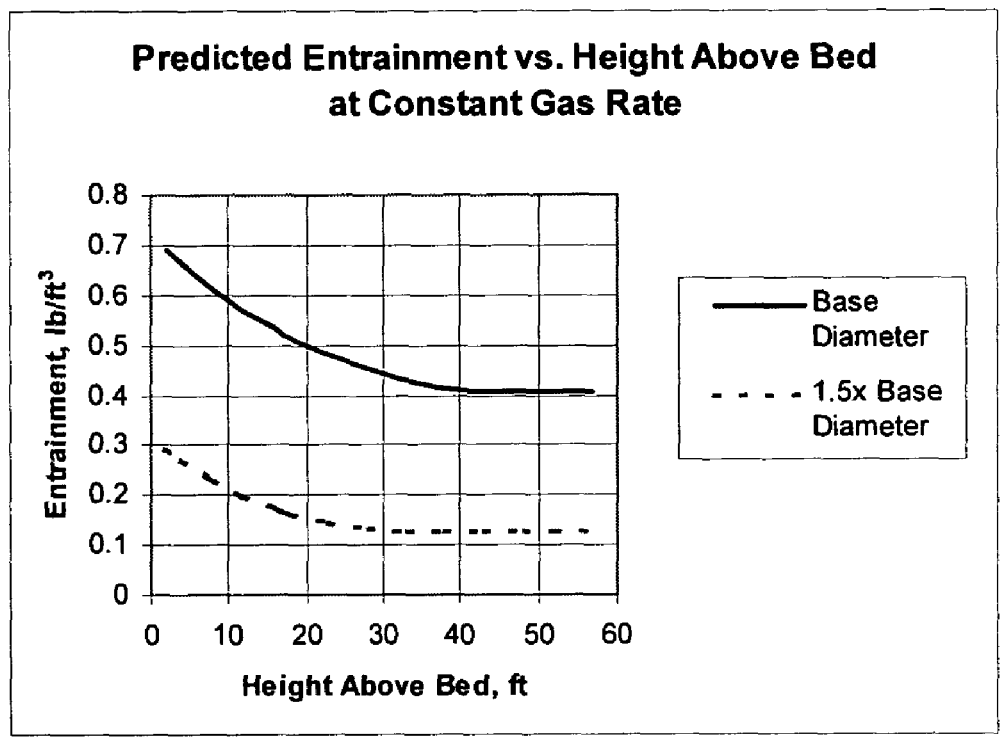
FIG. 3 is a graph plotting catalyst entrainment as a function of height above a dense phase bed.

If the superficial velocity of the regeneration medium entering the catalyst regenerator is high, most of the regeneration medium and gaseous byproducts formed from the regeneration process will coalesce and flow through the dense phase in the form of bubbles. These bubbles rise in a suspended-solids phase and burst at the surface of the dense phase. The bursting action of the bubbles throws large amounts of the particulate solids into the dilute phase. Coarse particles tend to readily drop back into the dense bed. Thus, the solids density of the dilute phase decreases with height immediately above the dense phase surface, as shown in FIG. 3, which is a graph plotting catalyst entrainment as a function of height above the dense phase surface. At a certain height, however, further increases in height have a negligible impact on the solids density of the dilute phase. The point of the dilute phase at which solids entrainment remains substantially constant without regard to further increases in height is referred to herein as the transport disengaging height (TDH). The decreased effect of increasing regenerator height above the TDH is also illustrated in FIG. 3, wherein the decrease in catalyst entrainment approaches a minimum entrainment value (as shown, approximately 0.41 lb/ft3 for the base diameter and 0.125 lb/ft3 for 1.5× the base diameter) regardless of increases in height above the TDH.

According to a preferred embodiment of the present invention, the distance between the dense phase surface and the separation unit inlet, e.g., a cyclone inlet, is greater than the TDH. Increasing the diameter of the separation zone, however, further reduces catalyst entrainment by reducing the superficial velocity to a point below the terminal velocity of some of the entrained catalyst.

In another embodiment, the regeneration medium is released into a distribution zone prior to its introduction into the regeneration zone. The distribution zone is a region, which preferably is oriented below the regeneration zone, wherein the regeneration medium is initially released prior to its introduction into the regeneration zone. A partition having one or more openings (preferably a plurality of openings), also referred to herein as a distributor grid, separates the distribution zone from the regeneration zone. In this embodiment, the one or more openings function as one or more of the regeneration medium inlets evenly distributing the regeneration medium into the regeneration zone. The distributor grid optionally includes two opposing major planar surfaces, and the openings extend between the two opposing major planar surfaces. In one embodiment, the distributor grid comprises a pipe grid distributor, well-known to those skilled in the art. As the pressure of the regeneration medium increases within the distribution zone due to the influx of new regeneration medium from the one or more regeneration medium inlets, the regeneration medium passes through the openings in the distributor grid and enters the regeneration zone. In this embodiment, the regeneration medium feed rate to the distribution zone should be sufficiently high to prevent the back flow of catalyst into the distribution zone. The distribution zone and the distributor grid provide the ability to distribute the regeneration medium into the regeneration zone and thus provide even catalyst regeneration characteristics in the catalyst regenerator. The distribution zone and distributor grid provide the additional advantage of providing a low superficial velocity, discussed below, in the regeneration zone as well as in the separation zone.

Preferably, the gaseous byproducts from the regeneration process optionally with unreacted regeneration medium (collectively, gaseous components) flow from the regeneration zone to the separation zone for removal from the catalyst regenerator. Due to their light weight, small volume and correspondingly high surface area to weight ratios, some catalyst particles may become entrained with these gaseous components and undesirably enter the separation zone. In the separation zone, a first amount of entrained catalyst particles desirably fall back into the regeneration zone and, ultimately, are redirected back to the HCA. The separation zone also optionally contains one or more separation devices, such as cyclonic separators, filters, screens, impingement devices, plates or cones, which facilitate the separation of entrained catalyst from the gaseous components in the separation zone. The separation zone optionally includes a plenum shell and a plenum volume for collecting gaseous components from the one or more separation devices. The plenum shell is in fluid communication with an exhaust outlet, and the gaseous components preferably are released from the separation zone through an exhaust outlet in the separation zone as an exhaust stream. According to the present invention, the amount of entrained catalyst that exits the separation zone through the exhaust outlet with the gaseous components is minimized or eliminated.

Catalyst entrainment can be minimized according to the present invention by providing a catalyst regenerator having specific design parameters, discussed below, and/or by carefully monitoring the catalyst flow regimes in the regeneration and separation zones of the catalyst regenerator. In one embodiment, the superficial velocity of the catalyst particles in the separation zone is lower than in conventional catalyst regenerators. As used herein, superficial velocity means the average gas velocity in the total open cross section of a vessel at a specified elevation. By operating under lower superficial velocities in the separation zone, the inertia of each respective catalyst particle in the separation zone will be correspondingly lower than in conventional catalyst regenerators. A reduction in entrained catalyst loss is realized when superficial velocity is reduced because only those solids whose terminal velocities are equal to or less than the gas superficial velocity continue to be entrained. Particles having terminal velocities greater than the gas superficial velocity will tend to fall back to the regeneration zone. The particle terminal velocity is a function of the density difference between the particle and the fluidizing medium and the particle diameter squared.

In one embodiment, the invention is directed to a catalyst regenerator having certain design parameters that facilitate the regeneration of catalyst particles in the catalyst regenerator in addition to providing desirable flow characteristics in the separation zone for increasing entrained catalyst retention. The catalyst regenerator preferably includes a regeneration zone into which a regeneration medium and an at least partially coked catalyst from a reactor can be fed. The regeneration zone has a first lower end, a first upper end and a first major length therebetween. The catalyst regenerator also includes a separation zone provided to separate entrained catalyst from gaseous components, e.g., combustion products of a regeneration process, and return the entrained catalyst to the regeneration zone. The separation zone has a second lower end, a second upper end and a second major length therebetween. The separation zone includes a swaged region adjacent the second lower end of the separation zone, and the second lower end is in fluid communication with the first upper end. The catalyst regenerator also includes a catalyst return into which regenerated catalyst can be fed from the regeneration zone and from which the regenerated catalyst can be directed to the reactor. According to one embodiment, the ratio of the second major length to the first major length is greater than 1.0, 1.25, 1.5, 2.0, 3.0, 4.0 or 5.0. Where indicated herein, these ratios are exclusive of the swaged region. If not so indicated, then these ratios are inclusive of the swaged region, which will be factored into the second major length. By providing a catalyst regenerator having these characteristics, desirable regeneration characteristics that minimize entrained catalyst loss can be achieved.

The separation zone preferably includes a swaged region and an upper separation region. The swaged region includes a narrow end and a broad end and increases in lateral cross-sectional area from the narrow end to the broad end. The narrow end is oriented at the proximal end of the swaged region, while the broad end is oriented adjacent the distal end of the swaged region. The broad end of the swaged region is adjacent to and in fluid communication with the upper separation region. The narrow end is oriented adjacent to and is in fluid communication with the regeneration zone. The increase in cross-sectional area in swaged region is provided in order to reduce the superficial velocity of entrained catalyst as the catalyst passes from the narrow end to the broad end of swaged region. The upper separation region preferably is formed of a hollow cylinder, e.g., a tubular member, having a uniform or substantially uniform lateral cross-sectional area to provide uniform superficial velocity characteristics for entrained catalyst contained therein.

Optionally, the regeneration zone has a first average diameter and the separation zone has a second average diameter. The ratio of the second average diameter to the first average diameter is at least about 1.1, at least 1.4, 1.7, 2.0, 2.3, 2.6 or 2.9. Where indicated herein, these ratios are exclusive of the swaged region. If not so indicated, then these ratios are inclusive of the swaged region, which will be factored in determining the second average diameter.

In terms of cross-sectional areas, the regeneration zone has a first average cross-sectional area and the separation zone has a second average cross-sectional area, and the ratio of the second average cross-sectional area to the first average cross-sectional area optionally is at least 1.2, at least 2.0, 3.0, 4.0, 5.3, 6.8, or 8.5. Where indicated herein, these ratios are exclusive of the swaged region. If not so indicated, then these ratios are inclusive of the swaged region, which will be factored in determining the second average cross-sectional area. These parameters are particularly well-suited for receiving at least partially coked catalyst from a methanol-to-olefin reactor.

In another embodiment, the present invention is directed to a process for regenerating catalyst. The process includes the steps of: (a) receiving a coked catalyst in a regeneration zone from a reactor; (b) contacting the coked catalyst with a regeneration medium in the regeneration zone at a first superficial velocity and under conditions effective to convert at least a portion of the coked catalyst to regenerated catalyst and forming gaseous products; (c) directing the gaseous products and entrained catalyst from the regeneration zone to a separation zone, wherein the entrained catalyst flows in the separation zone at a second superficial velocity; (d) separating a majority of the gaseous products in the separation zone from a majority of the entrained catalyst in the separation zone; (e) returning the majority of the entrained catalyst to the regeneration zone; and (f) directing the regenerated catalyst from the regeneration zone to the reactor, wherein the ratio of the first superficial velocity to the second superficial velocity is at least 1.2, at least 2.0, 3.0, 4.0, 5.3, 6.8 or 8.5. Where indicated herein, these ratios are exclusive of the superficial velocity of the swaged region. If not so indicated, then these ratios are inclusive of the superficial velocity in the swaged region, which will be factored into determining the second superficial velocity. The second superficial velocity optionally is less than about 1.0 meters per second, less than 0.5, 0.25, or 0.1 meters per second. If so indicated, these velocities are exclusive of the superficial velocity in the swaged region.

In another embodiment, the present invention is directed to a process for regenerating catalyst, wherein the process comprises the steps of: (a) receiving a coked catalyst in a regeneration zone from a reactor; (b) contacting the coked catalyst with a regeneration medium in the regeneration zone at a first superficial velocity and under conditions effective to convert at least a portion of the coked catalyst to regenerated catalyst and forming gaseous products; (c) directing the gaseous products and entrained catalyst from the regeneration zone to a separation zone, wherein the entrained catalyst flows in the separation zone at a second superficial velocity, the second superficial velocity being less than the first superficial velocity; (d) separating a majority of the gaseous products in the separation zone from a majority of the entrained catalyst in the separation zone; (e) returning the majority of the entrained catalyst to the regeneration zone; (f) releasing a flue gas stream comprising the majority of the gaseous products from the separation zone, wherein the flue gas stream contains less than about 0.5, less than 0.05, or less than 0.005 weight percent entrained catalyst, based on the total weight of the flue gas stream; and (g) directing the regenerated catalyst from the regeneration zone to the reactor. Optionally, the ratio of the first superficial velocity to the second superficial velocity is at least 1.2, at least 2.0, 3.0, 4.0, 5.3, 6.8 or 8.5. The second superficial velocity preferably is less than about 1.0 meters per second, 0.5, 0.25, or 0.1 meters per second. Preferably, the reactor is a methanol-to-olefin reactor, and the process includes the step of contacting methanol in the reactor with a molecular sieve catalyst under conditions effective to convert at least a portion of the methanol to light olefins and to form the coked catalyst.

Optionally, the catalyst regenerator includes one or more obstructing members, e.g., baffles, provided to obstruct the upward flow of entrained catalyst in the dense phase and/or the dilute phase thereby further reducing entrained catalyst loss. In one embodiment, the obstructing member is positioned in the dense phase. By orienting the obstructing member in the dense phase, the bubble size of the gaseous components in the dense phase can be advantageously reduced. The obstructing member also can be situated in a position where it breaks up larger bubbles. As a result, slugging and catalyst entrainment can be reduced. Additionally or alternatively, the obstructing member can be situated in one or more of the regeneration zone above the dense phase surface, and/or in the separation zone (e.g., in the swaged region and/or in the upper separation region). If the catalyst regenerator includes a plurality of layers of obstructing members, situated longitudinally with respect to one another, then each layer ideally is staggered with respect to its adjacent layer of obstructing members. By "staggered" it is meant that one layer is laterally offset with respect to a longitudinally adjacent layer. FIG. 2A, for example, illustrates a regenerator comprising two layers of hemitubular members in the separation zone. These layers are staggered with respect to one another in order to further reduce entrained catalyst loss. A third layer of hemispherical obstructing members is illustrated in the regeneration zone. However, the regeneration zone also may include a plurality of layers, which preferably are staggered with respect to one or more adjacent layers.

A variety of obstructing member(s) may be implemented according to the present invention. Several possible obstructing members are illustrated in FIG. 2A-2E. In a preferred embodiment, the obstructing member comprises one or more laterally extending hemitubular members 201, as shown in FIG. 2A. The hemitubular members 201 preferably include a proximally-facing concave end 202 and a distally-facing convex end 203. The hemitubular member 201 may be formed of one or more linear laterally extending structures as shown by linear hemitubular member 204, which optionally includes one or more openings therein 205 to facilitate the flow of gaseous components therethrough. In another embodiment, the obstructing member comprises one or more hemispherical members 206, each of which also preferably includes a proximally-facing concave end and a distally-facing convex end. In another embodiment, the hemitubular member forms a ring 200, which also includes a proximally-facing concave end and a distally-facing convex end.

In another embodiment, the obstructing member comprises one or more laterally extending inverted "v" structures 207, as shown in FIG. 2B. Each inverted "v" structure 207 preferably includes a distally-facing apex 209 to divert proximally moving catalyst back to the regeneration zone. The inverted "v" structure 207 optionally is formed of two substantially planar surfaces, as shown by "v" structure 210. The inverted "v" structure optionally includes one or more openings therein, not shown, similar to openings 205 in FIG. 2A. The openings facilitate the flow of gaseous components therethrough. In another embodiment, the obstructing member comprises one or more conical members 211 or pyramidal members (e.g., having triangular, square, rectangular, pentagonal or other geometrically shaped base). Optionally, the obstructing member lacks a laterally extending base. In another embodiment, the inverted "v" structure forms a ring 212, which also includes a distally-facing apex 213.

FIG. 2C illustrates another embodiment of the present invention, wherein the obstructing member comprises one or more laterally extending tubular members 214. Each tubular member 214 inherently includes a rounded surface to divert proximally moving catalyst back to the regeneration zone. The tubular member 214 optionally includes one or more openings therein, not shown, similar to openings 205 in FIG. 2A, which openings facilitate the flow of gaseous components therethrough. In another embodiment, the obstructing member comprises one or more spherical members 215. In another embodiment, the obstructing member comprises a tubular ring 216.

In another embodiment, the obstructing member comprises one or more laterally extending planar surfaces 217, as shown in FIG. 2D. Each planar surface 217 preferably includes a proximally facing major planar surface and a distally facing major planar surface. The shape of the laterally extending planar surfaces 217 optionally forms a circle 218, triangle, quadrilateral, square, rectangle 219, or any other two dimensional geometric shape. Each laterally extending planar surface 217 optionally includes one or more openings therein, not shown, similar to openings 205 in FIG. 2A. In another embodiment, the obstructing member comprises a planar ring 220 having an opening therein.

In another embodiment, the obstructing member comprises one or more screen members 221, as shown in FIG. 2E. In this embodiment, the one or more screen members 221 preferably cover the entire cross-sectional area of the region or zone in which the one or more screen members 221 are situated.

By implementing one or more of the features of the present invention, the entrained catalyst loss rate realized can be lower than in conventional regeneration systems. In one embodiment, the catalyst loss rate is less than 0.146, less than 0.073, or less than 0.0365 grams catalyst lost per kilogram catalyst fed to the catalyst regenerator.

FIG. 1 presents a partial longitudinal cross-sectional view of a swaged catalyst regenerator according to one embodiment of the present invention. As shown, the catalyst regenerator, generally designated 100, comprises a catalyst feed conduit 109, a catalyst return 110, one or more regeneration medium inlets 111, one or more regeneration medium feed conduits 124, an exhaust outlet 112, and a shell 101. Of course, the illustrated catalyst regenerator is purely exemplary, and the placement of regeneration medium feed conduits 124, catalyst feed conduit 109, catalyst return 110 or other components of the catalyst regenerator may vary widely depending on design preferences. Shell 101 includes an inner surface 102 and an outer surface 103, and defines regeneration zone 104, in which an at least partially coked catalyst contacts a regeneration medium under conditions effective to at least partially regenerate the coked catalyst. The shell 101 also defines separation zone 105 in which gaseous components are separated from entrained catalyst. The shell 101 also defines a regenerator top partition 116 and the regenerator bottom partition 117. The regenerator preferably is a "cold wall" vessel, meaning there is an inner insulating liner of refractory material, not shown, that insulates the shell 101. As a result, it is not necessary that the shell 101 be formed of a material capable of withstanding the extreme temperatures necessary for efficient catalyst regeneration. However, the separation devices 123, distribution plate 118, and obstructing members 134, if any, should be formed of alloy steel e.g., 304H SS) capable of withstanding the high temperatures necessary for catalyst regeneration.

Regeneration zone 104 includes a first lower end 113 and a first upper end 114. The first upper end 114 of the regeneration zone 104 is oriented distally with respect to the first lower end 113 and is adjacent the separation zone 105. As shown, the first lower end 113 of the regeneration zone 104 is defined by a distally facing surface of distributor grid 118. In embodiments lacking the optional distributor grid 118, the first lower end 113 of the regeneration zone 104 optionally is adjacent the inner surface of regenerator bottom partition 117. That is, the inner surface of regenerator bottom partition 117 optionally defines the first lower end 113 of regeneration zone 104. Preferably, the regeneration zone 104 is formed as a hollow cylinder, e.g., a tubular member, defining a constant or substantially constant cross-sectional hollow area throughout its longitudinal length, although the cross-section of regeneration zone 104 may form any of a variety of shapes such as a circle, oval, square, hexagon, etc. By providing a regeneration zone 104 having a constant cross-sectional area throughout its longitudinal length, however, desirably uniform catalyst regeneration properties, e.g., superficial velocity, can be realized.

The catalyst regenerator of the present invention optionally includes an obstructing member 134 situated above or below dense phase surface 133. The obstructing member 134 is provided to abruptly stop upward inertial motion of entrained catalyst. The obstructing member 134 optionally is formed of a plate, disc, grid, conical member, screen or a "donut" member, e.g., formed of a member (preferably a circular disc member) having opposing major planar surfaces and one or more openings extending between the opposing major planar surfaces, or any other device capable of slowing the speed and thus the inertia of entrained catalyst through obstructing contact. Exemplary obstructing members are illustrated in FIG. 2A-E, discussed in detail above. The obstructing member 134 also directs combustion products and unreacted regeneration medium, if any, toward separation zone 105 and, ultimately, to exhaust outlet 112. The obstructing member 134 preferably has a similar cross-sectional profile to that of the catalyst regenerator 100 adjacent the position of the obstructing member 134. For example, if the cross-section of the catalyst regenerator is circular at the position of the obstructing member 134, then the obstructing member also preferably has a circular outer shape, which may or may not have angled surfaces to direct catalyst particles back to the regeneration zone 104. Conical obstruction members are particularly preferred, preferably lacking a base as shown in FIG. 2B, wherein the apex of the conical obstruction member is adjacent its distal end in order to direct entrained catalyst particles from separation zone 105 back to regeneration zone 104. One or more arms, not shown for clarity, preferably are provided to attach the obstructing member 134 to the inner surface 102 of shell 101, thereby supporting the obstructing member 134. The angle of the conical member or other angled obstructing member from a plane parallel to grade preferably is greater than the angle of repose, which is defined herein as being the natural angle that a specified plurality of particles makes with a horizontal surface as the particles are poured onto the surface. Preferably the angle of the conical member is greater than about 3°, more preferably greater than about 45°, and most preferably greater than about 60°.

In one embodiment, a plurality of obstructing members 134 are provided to create a labyrinth whereby entrained catalyst contacts a plurality of surfaces to further decrease its inertial motion. The labyrinth also provides a path for directing the gaseous components in the catalyst regenerator 100, ultimately, to the one or more separation devices 123 and to the exhaust conduit 112. Several non-limiting embodiments of labyrinth obstructing members are illustrated in FIGS. 2A–2E. In order to prevent stagnant catalyst buildup in one or more regions of the labyrinth, one or more obstructing members of the labyrinth optionally are formed having a downward slope (or rounded edge) for directing catalyst back to the regeneration zone 104 as shown in FIGS. 2A–2C. The optional downward slope preferably forms an angle from a plane parallel to grade, which angle is greater than solids natural angle of repose. Preferably the angle of the downward slop is greater than about 30°, more preferably greater than about 45°, and most preferably greater than about 60°.

Unless otherwise indicated, separation zone 105 includes a swaged region 106 and an upper separation region 120. However, in portions of this specification and the appended claims, when so indicated, the term "separation zone" is exclusive of the swaged region 106 and refers to separation region 120.

The swaged region 106 includes a narrow end 107 and a broad end 108 and increases in lateral cross-sectional area from the narrow end 107 to the broad end 108. The narrow end 107 is oriented at the proximal end of the swaged region 106, while the broad end 108 is oriented adjacent the distal end of the swaged region 106. In FIG. 1, the swaged region 106 is between broken line 125 and broken line 126, which are provided for illustration purposes only. Broken line 125 separates swaged region 106 and regeneration zone 104, and broken line 126 separates swaged region 106 from upper separation region 120. The narrow end 107 is oriented adjacent to and is in fluid communication with the first upper end 114 of the regeneration zone 104, and the broad end 108 is adjacent to and is in fluid communication with the upper separation region 120 of separation zone 105. The increase in cross-sectional area in swaged region 106 is provided in order to reduce the superficial velocity of entrained catalyst as the catalyst passes from the narrow end 107 to the broad end 108 of swaged region 106.

The upper separation region 120 preferably is formed of a hollow cylinder, e.g., a tubular member, having a uniform or substantially uniform lateral cross-sectional area to provide uniform superficial velocity characteristics for entrained catalyst contained therein. The upper separation region 120 includes a first end 121 and a second end 122. The first end 121 of the upper separation region 120 is adjacent to and in fluid communication with the broad end 108 of the swaged region 106; the second end 122 of the upper separation region 120 preferably is laterally adjacent to the regenerator top partition 116. If the catalyst regenerator 100 includes a plenum shell 127 and a plenum volume 128, as shown in FIG. 1 and as discussed in more detail below, then the second end 122 of the upper separation region 120 preferably is laterally adjacent to the proximally facing outer surface of the plenum shell 127.

The exhaust outlet 112, which releases regeneration combustion products and possibly unreacted regeneration medium from the catalyst regenerator 100, is openly joined to the top of one or more separation devices 123. Gas conduit 129 is openly joined to plenum shell 127. Plenum volume 128 is formed within the boundaries of plenum shell 127 as joined to the regenerator top partition 116 defined by shell 101. The plenum shell 127 and plenum volume 128 are provided to collect regeneration combustion product and possibly unreacted regeneration medium exiting gas conduit 129 and direct that material to the exhaust outlet 112, which is openly joined to upper separation region 120 in the vicinity of plenum volume 128. Exhaust outlet 112 conveys the regeneration combustion products and possibly unreacted regeneration medium away from the catalyst regenerator 100. Such plenum designs are particularly useful in embodiments when a plurality of separation devices 123 are utilized, for example as shown in FIG. 1, where two sets of cyclone separators are joined to a single exhaust outlet 112 via plenum volume 128. The gas conduits 129 optionally are all openly joined to the plenum shell 127, and a single, secondary product exit conduit, e.g., exhaust outlet 112, is implemented to carry combustion products and possibly unreacted regeneration medium away from the catalyst regenerator 100. The plenum shell 127 is optional in the catalyst regenerator 100 of the present invention as some separation devices, e.g., certain cyclonic separators, filters, screens, impingement devices, plates or cones, function adequately with direct gaseous product removal.

The longitudinal distance between the first lower end 113 and first upper end 114 of regeneration zone 104 defines first major length α of regeneration zone 104. Semantically, the separation zone 105 as a whole (including swaged region 106 and upper separation region 120), is referred to herein as including a second lower end and a second upper end. Unless otherwise indicated herein, the second lower end is the narrow end 107 of swaged region 106, and the second upper end is the second end 122 of upper separation region 120. The longitudinal distance between the second lower end and the second upper end of separation zone 105 defines second major length β of separation zone 105. That is, second major length β is measured from vertex 130 of swage angle θ longitudinally to the proximally facing outer surface of the plenum shell 127. If the catalyst regenerator 100 does not include a plenum shell, then the second major length β is measured from the vertex 130 of the swage angle to the proximally-facing inner surface of the regenerator top partition 116. In one embodiment of the present invention, the ratio of the second major length β to the first major length α is greater than 1.0, optionally greater than 1.25, 1.5, 2.0, 3.0, 4.0 or 5.0.

In a preferred embodiment, the separation zone 105, preferably the upper separation region 120 thereof, includes one or more separation devices 123, which are used to separate entrained catalyst from gaseous components in separation zone 105. The separation devices 123 optionally are cyclonic separators, filters, screens, impingement devices, plates, cones or any other device, which would separate entrained catalyst from the gaseous components in separation zone 105. The separation devices 123 shown in FIG. 1 are cyclonic separators, each having a separation unit inlet 137, which receives gaseous components and entrained catalyst from separation zone 105, and a catalyst return dipleg 136, which directs separated catalyst particles proximally with respect to the separation unit inlet 137.

The design and operation of cyclone separators are known to those skilled in the art. See, for example, U.S. Pat. No. 5,518,695, incorporated in its entirety herein by reference. In the operation of a cyclone separator, vapor reaction product and unreacted regeneration medium, if any, proceeds up the cyclone separator and out the top via gas conduit 129, while the catalyst proceeds down the cyclone separator through catalyst return dipleg 136, exiting into one or more of upper separation region 120, swaged region 106 and/or regeneration zone 104 (either above or below dense phase surface 133).

As shown, the catalyst return diplegs 136 extend and open into, e.g., are in fluid communication with, upper separation region 120. However, in other embodiments, not shown, the catalyst return diplegs 136 open into one or more of swaged region 106 and/or the regeneration zone 104. Optionally, one or more of the catalyst return diplegs 136 open into the dense phase 115 or the region of the regeneration zone 104 that is above the dense phase 115. In this embodiment, not shown, one or more catalyst return diplegs 136 optionally extend through obstructing plate 134. In yet another embodiment, the catalyst return diplegs 136 extend through shell 101 and act as the catalyst return 110. That is, one or more of separation devices 123 optionally are in direct closely-coupled fluid communication with the HCA (or with one or more intermediate vessels, e.g., catalyst coolers). In other embodiments, not illustrated, the separation devices are positioned externally to the separation zone 105, outside of the shell 101 defining the separation zone 105, or a combination of externally and internally positioned separation zones.

According to the present invention, an angle θ, referred to herein as the "swage angle", is formed in a plane perpendicular to the outer surface 103 at vertex 130. The swage angle is the angle between the outer surface 103 of the swaged region 106 and an imaginary plane, a portion of which is shown as broken line 139, which plane is parallel to grade. Of course, in order for the catalyst regenerator 100 to have a swaged region 106, the swage angle must be less than 90°. Preferably, swage angle θ is greater than the solids natural angle of repose in order to prevent the buildup of stagnant catalyst particles on the inner surface 102 of swaged region 106. Preferably the swage angle is greater than about 30°, more preferably greater than about 45°, and most preferably greater than about 60°. By providing a catalyst regenerator 100 having the disclosed swage angles, a desirable decrease in superficial velocity between the regeneration zone 104 and the upper separation region 120 can be obtained. This decrease in superficial velocity allows for increased entrained catalyst recovery and a commensurate decrease in operating expenses.

Lower swage angles, however, also may be implemented according to the present invention. In low swage angle embodiments, the buildup of stagnant catalyst particles along the inner surface 102 defining swaged region 106 can be controlled and reduced by providing one or more fluidization nozzles, not shown, in the swaged region 106. The fluidization nozzles inject a fluidization agent into the swaged region 106 at the inner surface 102 to facilitate the flow of catalyst particles from the swaged region 106 back to regeneration zone 104. Thus, the swage angle optionally is less than 30°, less than 20°, or less than 10°. By providing a low swage angle, the longitudinal length of the swaged region 102 can be reduced thereby providing a commensurate decrease in the production costs associated with building a catalyst regenerator according to the present invention.

In a preferred embodiment, the catalyst regenerator 100 includes a distribution zone 119, which ideally is oriented below the regeneration zone 104. Prior to its introduction into the regeneration zone 104, regeneration medium is introduced through one or more regeneration medium feed conduits 124 into the distribution zone 119. A distributor grid 118 separates the distribution zone 119 from the regeneration zone 104. The distributor grid 118 includes one or more regeneration medium inlets 111 (as shown, a plurality of regeneration medium inlets 111), through which the regeneration medium is released into the regeneration zone 104 from the distribution zone 119. The catalyst regenerator embodiment that includes a distributor grid provides for desirably even regeneration medium distribution characteristics. The distribution zone 119 and distributor grid 118 provide the additional advantage of providing a low superficial velocity in the regeneration zone 104 as well as in the separation zone 105.

A catalyst feed conduit 109 preferably is in fluid communication with the regeneration zone 104 and directs an at least partially coked catalyst, preferably in a fluidized manner, into the regeneration zone 104 through catalyst inlet 131. The catalyst feed conduit 109 optionally is in fluid communication with one or more of a HCA, a stripping unit, and/or a catalyst cooler, none of which are shown in FIG. 1. As shown in FIG. 1, catalyst feed conduit 109 extends through regenerator bottom partition 117, the distribution zone 119, and distributor grid 118. Thus, the catalyst feed conduit 109 preferably releases the at least partially coked catalyst directly into the regeneration zone 104 to form a dense phase 115. Optionally, some catalyst regeneration occurs within catalyst feed conduit 109 as the at least partially coked catalyst transported therein contacts the fluidization agent, typically air, under high temperature and pressure conditions.

In operation, the at least partially coked catalyst in dense phase 115 contacts a regeneration medium received via regeneration medium inlet(s) 111 under conditions effective to at least partially regenerate the at least partially coked catalyst. If the regeneration unit 100 does not include a distribution zone 119, then the catalyst feed conduit 109 passes through regenerator bottom partition 117 and releases the at least partially coked catalyst directly into the regeneration zone 104 to form the dense phase 115, without passing through distributor grid 118.

A catalyst return 110 also is provided in fluid communication with the regeneration zone 104. The catalyst return 110 directs the at least partially regenerated catalyst away from the regeneration zone 104 of the catalyst regenerator 100 and, ultimately, back to the HCA. As shown, catalyst return 110 includes a catalyst outlet 132 for receiving the at least partially regenerated catalyst from dense phase 115. Ideally, the catalyst return 110 is in fluid communication with a series of conduits that direct the at least partially regenerated catalyst back to the hydrocarbon conversion apparatus, optionally after it passes through a catalyst cooler, not shown. As shown in FIG. 1, catalyst return 110 extends through regenerator bottom partition 117, the distribution zone 119, and distributor grid 118, and preferably extends into dense phase 115, but below the dense phase surface 133. However, in other embodiments, not shown, the catalyst return 110 extends through the dense phase surface 133 and optionally extends into one or more of the following regions: the region of the regeneration zone 104 above the dense phase surface 133; the swaged region 106; and/or the upper separation region 120. Thus, catalyst outlet 132 optionally opens into and receives catalyst from the dense phase 115, the region of the regeneration zone 104 above the dense phase surface 133, the swaged region 106, and/or the upper separation region 120.

The distal end of catalyst return 110 optionally includes a fluted member 135, having a narrow proximal end and a broad distal end. The narrow proximal end is attached to a tubular conduit that forms catalyst return 110. The broad end forms catalyst 132. The fluted member 135 provides a catalyst outlet 132 having increased receiving capacity and thus facilitates catalyst removal from the catalyst regenerator 100. The broad distal end optionally includes one or more grooves 138, which further increase the receiving capacity of the catalyst return 110 by increasing the receiving area of the catalyst outlet 132.

The geometry of the catalyst regenerator 100 may vary widely. In the embodiment in FIG. 1, the geometry is comprised of a first cylindrical member, which forms the regeneration zone 104, a partial conical section, which forms the swaged region 106, and a second cylindrical member (of greater diameter and cross-sectional area than the first cylindrical member), which forms the upper separation region 120. Optionally, the geometry of one or more of the regeneration zone 104, the swaged region 106, and/or the upper separation region 120 is comprised of a single, right frustum of a cone. Other suitable geometric shapes include, but are not limited to, triangular prisms, and frusta of pyramids, rectangular and square wedges and frusta of pyramids, and pentagonal, hexagonal, septagonal and octagonal prismatoids and frusta thereof, general and right. Further non-limiting examples include various polyhedrons, such as a tetrahedron, an octohedron, a dodecahedron or an icosahedron, and conical spheres and spherical sectors, and torus and barrels in their circular, elliptical or parabolic forms, and frusta thereof, general and right. Multiple occurrences of any of these geometric shapes defining one or more of the regeneration zone 104, the swaged region 106 and/or the upper separation region 120 are also within the scope of an apparatus of the present invention.

The size of the catalyst regenerator 100, and the sections thereof, depends on parameters such as the superficial gas velocity, solids hydrodynamics, pressure, and regeneration capacity of the catalyst regeneration process. In the present invention, the regeneration zone 104 desirably has a height from about 6 feet (1.8 m) to about 30 feet (9.1 m), preferably from about 10 feet (3.0 m) to about 20 ft (6.1 m). The upper separation region 120 desirably has a height from about 20 feet (6.1 m) to about 50 feet (15.2 m), preferably from about 25 feet (7.6 m) to about 45 feet (13.7 m) and most preferably from about 30 feet (9.1 m) to about 35 feet (10.7 m). Thus, the total summed height of separation zone 120 and regeneration zone 104 will be from about 26 to 80 feet (7.9 to 24.4 m), more preferably from about 35 to 70 feet (10.7 to 21.3 m), and most preferably from about 42 to about 55 feet (12.8 to 16.8 m). The height of the swaged region 106 depends upon the difference in diameter between the separation zone 120 and the regeneration zone 104 and upon the desired swage angle. Of course, larger or smaller heights and diameters may be implemented in these various regions of the catalyst regenerator 100 depending on the amount of coked catalyst to be regenerated therein.

One aspect of the present invention can be expressed by the ratio of the flow rate of catalyst entering the catalyst regenerator to the length of the regeneration zone and/or the separation zone. In one embodiment, the ratio is greater than 0.3 lb/sec/ft (0.45 kg/sec/m), optionally greater than 1.0 lb/sec/ft (1.5 kg/sec/m) and optionally greater than 6.0 lbs/sec/ft (9.0 kg/sec/m), based on the total length of the regeneration and separation zones.

In one particularly preferred embodiment, the ratio of the height of the separation zone 105 to the height of the regeneration zone 104 is greater than 1, preferably greater than 1.25, 1.5, 2.0, 3.0, 4.0 or 5.0.

In one embodiment of the present invention, the ratio of the average cross sectional area of the separation zone 105 to the average cross sectional area of the regeneration zone 104 is from about 1 to about 8.0, preferably from about 1.5 to about 3.0, and most preferably from about 2.0 to about 2.5. In terms of lower range limitations, the regeneration zone 104 has a first average cross-sectional area and the separation zone 105 has a second average cross-sectional area, and the ratio of the second average cross-sectional area to the first average cross-sectional area optionally is at least about 1.2, at least 2.0, 3.0, 4.0, 5.3, 6.8, or 8.5.

The preferred embodiments of the present invention relate to regenerating an at least partially coked catalyst received from a methanol to olefins (MTO) reaction system, which is described in more detail below. In the MTO reaction process, an oxygenate, e.g., methanol, contacts a catalyst in a HCA under conditions effective to convert at least a portion of the oxygenate to light olefins and at least partially deactivating the catalyst to form an at least partially deactivated catalyst, e.g., a coked catalyst. The at least partially deactivated catalyst is directed to a catalyst regenerator according to the present invention, wherein the at least partially deactivated catalyst is regenerated to form regenerated catalyst. At least a portion of the regenerated catalyst is directed to the reaction unit. The deactivated catalyst optionally contacts a stripping medium in a stripping unit under conditions effective to remove interstitial hydrocarbons from the deactivated catalyst.

The type of HCA that is implemented with the catalyst regenerator of the present invention will now be described in more detail. The reaction processes can take place in a variety of catalytic HCA's such as hybrid reactors that have dense bed or fixed bed reaction zones and/or fast fluidized bed reaction zones coupled together, circulating fluidized bed reactors, riser reactors, and the like. Suitable conventional reactor types are described in for example U.S. Pat. No. 4,076,796, U.S. Pat. No. 6,287,522 (dual riser), and Fluidization Engineering, D. Kunii and O. Levenspiel, Robert E. Krieger Publishing Company, New York, N.Y. 1977, which are all herein fully incorporated by reference.

The preferred HCA type is selected from the riser reactors generally described in Riser Reactor, Fluidization and Fluid-Particle Systems, pages 48 to 59, F. A. Zenz and D. F. Othmer, Reinhold Publishing Corporation, New York, 1960, and U.S. Pat. No. 6,166,282 (fast-fluidized bed reactor), which are incorporated herein by reference. Most preferably, the HCA includes a plurality of riser reactors, as disclosed in U.S. patent application Ser. No. 09/564,613 filed May 4, 2000 to Lattner et al., the entirety of which is incorporated herein by reference.

Fresh feedstock, preferably containing one or more oxygenates, optionally with one or more diluents, is fed to the one or more riser reactors in a given reactor unit in which a zeolitic or non-zeolitic molecular sieve catalyst composition or coked version thereof is introduced. In one embodiment, the molecular sieve catalyst composition or coked version thereof is contacted with a liquid or gas, or combination thereof, prior to being introduced to the riser reactor(s), preferably the liquid is water or methanol, and the gas is an inert gas such as nitrogen or steam.

The feedstock entering an individual reactor system is preferably converted, partially or fully, in the first reactor zone into a gaseous effluent that enters the disengaging vessel along with a coked molecular sieve catalyst composition which is at least partially deactivated. In the preferred embodiment, cyclone(s) within the disengaging vessel are designed to separate the molecular sieve catalyst composition, preferably a coked molecular sieve catalyst composition, from the gaseous effluent containing one or more olefin(s) within the disengaging zone. Cyclones are preferred, however, gravity effects within the disengaging vessel will also separate the catalyst compositions from the gaseous effluent. Other methods for separating the catalyst compositions from the gaseous effluent include the use of plates, caps, elbows, and the like.

In one embodiment of a disengaging system in an individual HCA, the disengaging system includes a disengaging vessel. In one embodiment, a lower portion of the disengaging vessel is a stripping zone. In the stripping zone the at least partially coked molecular sieve catalyst composition is contacted with a stripping medium which is a gas, preferably one or a combination of steam, methane, carbon dioxide, carbon monoxide, hydrogen, or an inert gas such as argon, preferably steam, to recover adsorbed interstitial hydrocarbons from the at least partially coked molecular sieve catalyst composition that is then introduced to the regeneration system. Ideally, from about 2 to about 10, more preferably about 2 to about 6, and most preferably 3 to about 5 pounds of stripping medium, e.g., steam, is provided to the stripping unit for every 1000 pounds of catalyst. In another embodiment, the stripping zone is in a separate vessel from the disengaging vessel and the stripping medium is passed at a gas hourly superficial velocity (GHSV) of from 1 hr-1 to about 20,000 hr-1 based on the volume of gas to volume of coked molecular sieve catalyst composition, preferably at an elevated temperature from 250° C. to about 750° C., preferably from about 350° C. to 650° C., over the coked molecular sieve catalyst composition.

In one preferred embodiment of the process for converting an oxygenate to olefin(s) using a silicoaluminophosphate molecular sieve catalyst composition, the process is operated at a WHSV of at least 20 hr-1 and a Temperature Corrected Normalized Methane Selectivity (TCNMS) of less than 0.016, preferably less than or equal to 0.01. See, for example, U.S. Pat. No. 5,952,538, which is herein fully incorporated by reference.

The optional multiple riser HCA's of the present invention are useful to conduct most any hydrocarbon conversion process in which a fluidized catalyst is employed. Typical reactions include, for example, olefin interconversion reactions, oxygenate to olefin conversion reactions (e.g., MTO reactions), oxygenate to gasoline conversion reactions, malaeic anhydride formulation, vapor phase methanol synthesis, phthalic anhydride formulation, Fischer Tropsch reactions, and acrylonitrile formulation.

The process for converting oxygenates to olefins employs a feed including an oxygenate. As used herein, the term "oxygenate" is defined to include, but is not necessarily limited to, hydrocarbons containing oxygen such as the following: aliphatic alcohols, ethers, carbonyl compounds (aldehydes, ketones, carboxylic acids, carbonates, and the like), and mixtures thereof. The aliphatic moiety desirably should contain in the range of from about 1–10 carbon atoms and more desirably in the range of from about 1–4 carbon atoms. Representative oxygenates include, but are not necessarily limited to, lower molecular weight straight chain or branched aliphatic alcohols, and their unsaturated counterparts. Examples of suitable oxygenates include, but are not necessarily limited to the following: methanol; ethanol; n-propanol; isopropanol; C4–C10 alcohols; methyl ethyl ether; dimethyl ether; diethyl ether; di-isopropyl ether; methyl formate; formaldehyde; di-methyl carbonate; methyl ethyl carbonate; acetone; and mixtures thereof. Desirably, the oxygenate used in the conversion reaction is selected from the group consisting of methanol, dimethyl ether and mixtures thereof. More desirably the oxygenate is methanol. The total charge of feed to the riser reactors may contain additional components, such as diluents.

One or more diluents may be fed to the riser reactors with the oxygenates, such that the total feed mixture comprises diluent in a range of from about 1 mol % and about 99 mol %. Diluents which may be employed in the process include, but are not necessarily limited to, helium, argon, nitrogen, carbon monoxide, carbon dioxide, hydrogen, water, paraffins, other hydrocarbons (such as methane), aromatic compounds, and mixtures thereof. Desired diluents include, but are not necessarily limited to, water and nitrogen.

A portion of the feed may be provided to the HCA in liquid form. When a portion of the feed is provided in a liquid form, the liquid portion of the feed may be either oxygenate, diluent or a mixture of both. The liquid portion of the feed may be directly injected into the individual riser reactors, or entrained or otherwise carried into the riser reactors with the vapor portion of the feed or a suitable carrier gas/diluent. By providing a portion of the feed (oxygenate and/or diluent) in the liquid phase, the temperature in the riser reactors can be controlled. The exothermic heat of reaction of oxygenate conversion is partially absorbed by the endothermic heat of vaporization of the liquid portion of the feed. Controlling the proportion of liquid feed to vapor feed fed to the reactor is one possible method for controlling the temperature in the reactor and in particular in the riser reactors.

A liquid feedstock optionally is fed separately or jointly with a vapor feedstock. The amount of feed provided in a liquid form, whether fed separately or jointly with the vapor feed, is from about 0.0 wt. % to about 85 wt. % of the total oxygenate content plus diluent in the feed. More desirably, the range is from about 1 wt. % to about 75 wt. % of the total oxygenate plus diluent feed, and most desirably the range is from about 5 wt. % to about 65 wt. %. The liquid and vapor portions of the feed may be the same composition, or may contain varying proportions of the same or different oxygenates and same or different diluents. One particularly effective liquid diluent is water, due to its relatively high heat of vaporization, which allows for a high impact on the reactor temperature differential with a relatively small rate. Other useful diluents are described above. Proper selection of the temperature and pressure of any appropriate oxygenate and/or diluent being fed to the reactor will ensure at least a portion is in the liquid phase as it enters the reactor and/or comes into contact with the catalyst or a vapor portion of the feed and/or diluent.

Optionally, the liquid fraction of the feed may be split into portions and introduced to riser reactors a multiplicity of locations along the length of the riser reactors. This may be done with either the oxygenate feed, the diluent or both. Typically, this is done with the diluent portion of the feed. Another option is to provide a nozzle which introduces the total liquid fraction of the feed to the riser reactors in a manner such that the nozzle forms liquid droplets of an appropriate size distribution which, when entrained with the gas and solids introduced to the riser reactors, vaporize gradually along the length of the riser reactors. Either of these arrangements or a combination thereof may be used to better control the temperature differential in the riser reactors. The means of introducing a multiplicity of liquid feed points in a reactor or designing a liquid feed nozzle to control droplet size distribution is well known in the art and is not discussed here.

The catalyst suitable for catalyzing an oxygenate-to-olefin conversion reaction includes a molecular sieve and mixtures of molecular sieves. Molecular sieves can be zeolitic (zeolites) or non-zeolitic (non-zeolites). Useful catalysts may also be formed from mixtures of zeolitic and non-zeolitic molecular sieves. Desirably, the catalyst includes a non-zeolitic molecular sieve. Desired molecular sieves for use with an oxygenate to olefins conversion reaction include "small" and "medium" pore molecular sieves. "Small pore" molecular sieves are defined as molecular sieves with pores having a diameter of less than about 5.0 Angstroms. "Medium pore" molecular sieves are defined as molecular sieves with pores having a diameter from about 5.0 to about 10.0 Angstroms.

Useful zeolitic molecular sieves include, but are not limited to, mordenite, chabazite, erionite, ZSM-5, ZSM-34, ZSM-48 and mixtures thereof. Methods of making these molecular sieves are known in the art and need not be discussed here. Structural types of small pore molecular sieves that are suitable for use in this invention include AEI, AFT, APC, ATN, ATT, ATV, AWW, BIK, CAS, CHA, CHI, DAC, DDR, EDI, ERI, GOO, KFI, LEV, LOV, LTA, MON, PAU, PHI, RHO, ROG, THO, and substituted forms thereof. Structural types of medium pore molecular sieves that are suitable for use in this invention include MFI, MEL, MTW, EUO, MTT, HEU, FER, AFO, AEL, TON, and substituted forms thereof.

Silicoaluminophosphates ("SAPOs") are one group of non-zeolitic molecular sieves that are useful in an oxygenate to olefins conversion reaction. SAPOs comprise a three-dimensional microporous crystal framework structure of [SiO2], [AlO2] and [PO2] tetrahedral units. The way Si is incorporated into the structure can be determined by 29Si MAS NMR. See Blackwell and Patton, J. Phys. Chem., 92, 3965 (1988). The desired SAPO molecular sieves will exhibit one or more peaks in the 29Si MAS NMR, with a chemical shift [(Si)] in the range of −88 to −96 ppm and with a combined peak area in that range of at least 20% of the total peak area of all peaks with a chemical shift [(Si)] in the range of −88 ppm to −115 ppm, where the [(Si)] chemical shifts refer to external tetramethylsilane (TMS).

It is desired that the silicoaluminophosphate molecular sieve used in such a process have a relatively low Si/Al2 ratio. In general, the lower the Si/Al2 ratio, the lower the C1–C4 saturates selectivity, particularly propane selectivity. A Si/Al2 ratio of less than 0.65 is desirable, with a Si/Al2 ratio of not greater than 0.40 being preferred, and a SiAl2 ratio of not greater than 0.32 being particularly preferred.

Silicoaluminophosphate molecular sieves are generally classified as being microporous materials having 8, 10, or 12 membered ring structures. These ring structures can have an average pore size ranging from about 3.5–15 angstroms. Preferred are the small pore SAPO molecular sieves having an average pore size ranging from about 3.5 to 5 angstroms, more preferably from 4.0 to 5.0 angstroms. These pore sizes are typical of molecular sieves having 8 membered rings.

In general, silicoaluminophosphate molecular sieves comprise a molecular framework of corner-sharing [SiO2], [AlO2], and [PO2] tetrahedral units. This type of framework is effective in converting various oxygenates into olefin products.

Suitable silicoaluminophosphate molecular sieves for use in an oxygenate to olefin conversion process include SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47, SAPO-56, the metal containing forms thereof, and mixtures thereof. Thus, at least partially coked catalyst regenerated by the catalyst regenerator optionally contains molecular sieve particles selected from the group consisting of SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47, SAPO-56, metal containing forms thereof, intergrown forms thereof, and mixtures thereof. Preferred are SAPO-18, SAPO-34, SAPO-35, SAPO-44, and SAPO-47, particularly SAPO-18 and SAPO-34, including the metal containing forms thereof, and mixtures thereof. As used herein, the term mixture is synonymous with combination and is considered a composition of matter having two or more components in varying proportions, regardless of their physical state.

Preferably, the at least partially coked catalyst that is fed to the catalyst regenerator has a d50 particle size from about 20 to about 200 microns. The dx particle size means that x percent by volume of the formulated catalyst composition particles have a particle diameter no greater than the dx value. For the purposes of this definition, the particle size distribution (PSD) used to define the dx value is measured using well known laser scattering techniques using a Microtrac Model 3000 particle size analyzer from Microtrac, Inc. (Clearwater, Fla). "Particle diameter" as used herein means the diameter of a specified spherical particle or the equivalent diameter of non-spherical particles as measured by laser scattering using a Microtrac Model 3000 particles size analyzer.

Additional olefin-forming molecular sieve materials can be mixed with the silicoaluminophosphate catalyst if desired. Several types of molecular sieves exist, each of which exhibit different properties. Structural types of small pore molecular sieves that are suitable for use in this invention include AEI, AFT, APC, ATN, ATT, ATV, AWW, BIK, CAS, CHA, CHI, DAC, DDR, EDI, ERI, GOO, KFI, LEV, LOV, LTA, MON, PAU, PHI, RHO, ROG, THO, and substituted forms thereof. Structural types of medium pore molecular sieves that are suitable for use in this invention include MFI, MEL, MTW, EUO, MTT, HEU, FER, AFO, AEL, TON, and substituted forms thereof. Preferred molecular sieves which can be combined with a silicoaluminophosphate catalyst include ZSM-5, ZSM-34, erionite, and chabazite.

Substituted SAPOs form a class of molecular sieves known as "MeAPSOs," which are also useful in the present invention. Processes for making MeAPSOs are known in the art. SAPOs with substituents, such as MeAPSOs, also may be suitable for use in the present invention. Suitable substituents, "Me," include, but are not necessarily limited to, nickel, cobalt, manganese, zinc, titanium, strontium, magnesium, barium, and calcium. The substituents may be incorporated during synthesis of the MeAPSOs. Alternately, the substituents may be incorporated after synthesis of SAPOs or MeAPSOs using many methods. These methods include, but are not necessarily limited to, ion-exchange, incipient wetness, dry mixing, wet mixing, mechanical mixing, and combinations thereof.

Desired MeAPSOs are small pore MeAPSOs having pore size smaller than about 5 Angstroms. Small pore MeAPSOs include, but are not necessarily limited to, NiSAPO-34, CoSAPO-34, NiSAPO-17, CoSAPO-17, and mixtures thereof.

Aluminophosphates (ALPOs) with substituents, also known as "MeAPOs," are another group of molecular sieves that may be suitable for use in an oxygenate to olefin conversion reaction, with desired MeAPOs being small pore MeAPOs. Processes for making MeAPOs are known in the art. Suitable substituents include, but are not necessarily limited to, nickel, cobalt, manganese, zinc, titanium, strontium, magnesium, barium, and calcium. The substituents may be incorporated during synthesis of the MeAPOs. Alternately, the substituents may be incorporated after synthesis of ALPOs or MeAPOs using many methods. The methods include, but are not necessarily limited to, ion-exchange, incipient wetness, dry mixing, wet mixing, mechanical mixing, and combinations thereof.

The molecular sieve may also be incorporated into a solid composition, preferably solid particles, in which the molecular sieve is present in an amount effective to catalyze the desired conversion reaction. The solid particles may include a catalytically effective amount of the molecular sieve and matrix material, preferably at least one of a filler material and a binder material, to provide a desired property or properties, e.g., desired catalyst dilution, mechanical strength and the like, to the solid composition. Such matrix materials are often to some extent porous in nature and often have some nonselective catalytic activity to promote the formation of undesired products and may or may not be effective to promote the desired chemical conversion. Such matrix, e.g., filler and binder, materials include, for example, synthetic and naturally occurring substances, metal oxides, clays, silicas, aluminas, silica-aluminas, silica-magnesias, silica-zirconias, silica-thorias, silica-beryllias, silica-titanias, silica-alumina-thorias, silica-aluminazirconias, and mixtures of these materials.

The solid catalyst composition preferably comprises about 1% to about 99%, more preferably about 5% to about 90%, and still more preferably about 10% to about 80%, by weight of molecular sieve; and an amount of about 1% to about 99%, more preferably about 5% to about 90%, and still more preferably about 10% to about 80%, by weight of matrix material.

The preparation of solid catalyst compositions, e.g., solid particles, comprising the molecular sieve and matrix material, is conventional and well known in the art and, therefore, is not discussed in detail here.

The catalyst may further contain binders, fillers, or other material to provide better catalytic performance, attrition resistance, regenerability, and other desired properties. Desirably, the catalyst is fluidizable under the reaction conditions. The catalyst should have particle sizes of from about 5 μ to about 3,000 μ, desirably from about 10 μ to about 200 μ, and more desirably from about 20 μ to about 150 μ. The catalyst may be subjected to a variety of treatments to achieve the desired physical and chemical characteristics. Such treatments include, but are not necessarily limited to, calcination, ball milling, milling, grinding, spray drying, hydrothermal treatment, acid treatment, base treatment, and combinations thereof.

Desirably, in an oxygenate to olefin conversion reaction conducted in one or more HCA's employs a gas superficial velocity in the riser reactors of greater than 1 meter per second (m/s). As used herein and in the claims, the term, "gas superficial velocity," is defined as the volumetric flow rate of vaporized feedstock, and any diluent, divided by the open reactor cross-sectional area. Because the oxygenate is converted to a product including a light olefin while flowing through the reactor, the gas superficial velocity may vary at different locations within the reactor depending on the total number of moles of gas present and the cross section of a particular location in the reactor, temperature, pressure, and other relevant reaction parameters. The gas superficial velocity, including any diluents present in the feedstock, is maintained at a rate greater than 1 meter per second (m/s) at any point in the reactor. Desirably, the gas superficial velocity is greater than about 2 m/s. More desirably, the gas superficial velocity is greater than about 2.5 m/s. Even more desirably, the gas superficial velocity is greater than about 4 m/s. Most desirably, the gas superficial velocity is greater than about 8 m/s.

Maintaining the gas superficial velocity at these rates increases the approach to plug flow behavior of the gases flowing in the riser reactors. As the gas superficial velocity increases above 1 m/s, a reduction in axial diffusion or back mixing of the gases results from a reduction in internal recirculation of solids, which carry gas with them. (Ideal plug flow behavior occurs when elements of the homogeneous fluid reactant move through a reactor as plugs moving parallel to the reactor axis). Minimizing the back mixing of the gases in the reactor increases the selectivity to the desired light olefins in the oxygenate conversion reaction.

When the gas superficial velocity approaches 1 m/s or higher, a substantial portion of the catalyst in the reactor may be entrained with the gas exiting the riser reactors. At least a portion of the catalyst exiting the riser reactors is recirculated to recontact the feed through the catalyst return.

Desirably, the rate of catalyst, comprising molecular sieve and any other materials such as binders, fillers, etc., recirculated to recontact the feed is from about 1 to about 100 times, more desirably from about 10 to about 80 times, and most desirably from about 10 to about 50 times the total feed rate, by weight, of oxygenates to the reactor.

The temperature useful to convert oxygenates to light olefins varies over a wide range depending, at least in part, on the catalyst, the fraction of regenerated catalyst in a catalyst mixture, and the configuration of the reactor apparatus and the reactor. Although these processes are not limited to a particular temperature, best results are obtained if the process is conducted at a temperature from about 200° C. to about 1000° C., more preferably from about 200° C. to about 700° C., desirably from about 250° C. to about 600° C., and most desirably from about 300° C. to about 550° C. Lower temperatures generally result in lower rates of reaction, and the formation rate of the desired light olefin products may become markedly slower. However, at temperatures greater than 700° C., the process may not form an optimum amount of light olefin products, and the rate at which coke and light saturates form on the catalyst may become too high.

Light olefins will form—although not necessarily in optimum amounts—at a wide range of pressures including, but not limited to, pressures from about 0.1 kPa to about 5 MPa. A desired pressure is from about 5 kPa to about 1 MPa and most desirably from about 20 kPa to about 500 kPa. The foregoing pressures do not include that of a diluent, if any, and refer to the partial pressure of the feed as it relates to oxygenate compounds and/or mixtures thereof. Pressures outside of the stated ranges may be used and are not excluded from the scope of the invention. Lower and upper extremes of pressure may adversely affect selectivity, conversion, coking rate, and/or reaction rate; however, light olefins will still form and, for that reason, these extremes of pressure are considered part of the present invention.

A wide range of WHSV's for the oxygenate conversion reaction, defined as weight of total oxygenate fed to the riser reactors per hour per weight of molecular sieve in the catalyst in the riser reactors, function with the present invention. The total oxygenate fed to the riser reactors includes all oxygenate in both the vapor and liquid phase. Although the catalyst may contain other materials which act as inerts, fillers or binders, the WHSV is calculated using only the weight of molecular sieve in the catalyst in the riser reactors. The WHSV is desirably high enough to maintain the catalyst in a fluidized state under the reaction conditions and within the reactor configuration and design. Generally, the WHSV is from about 1 hr-1 to about 5000 hr-1, desirably from about 2 hr-1 to about 3000 hr-1, and most desirably from about 5 hr-1 to about 1500 hr-1. The applicants have discovered that operation of the oxygenate to olefin conversion reaction at a WHSV greater than 20 hr-1 reduces the methane content in the product slate of the conversion reaction. Thus, the conversion reaction is desirably operated at a WHSV of at least about 20 hr-1. For a feed comprising methanol, dimethyl ether, or mixtures thereof, the WHSV is desirably at least about 20 hr-1 and more desirably from about 20 hr-1 to about 300 hr-1.

The method of making the preferred olefin product in this invention can include the additional step of making the oxygenate compositions from hydrocarbons such as oil, coal, tar sand, shale, biomass and natural gas. Methods for making the compositions are known in the art. These methods include fermentation to alcohol or ether, making synthesis gas, then converting the synthesis gas to alcohol or ether. Synthesis gas can be produced by known processes such as steam reforming, autothermal reforming and partial oxidization.

One skilled in the art will also appreciate that the olefins produced by the oxygenate-to-olefin conversion reaction of the present invention can be polymerized to form polyolefins, particularly polyethylene and polypropylene. Processes for forming polyolefins from olefins are known in the art. Catalytic processes are preferred. Particularly preferred are metallocene, Ziegler/Natta and acid catalytic systems. See, for example, U.S. Pat. Nos. 3,258,455; 3,305,538; 3,364,190; 5,892,079; 4,659,685; 4,076,698; 3,645,992; 4,302,565; and 4,243,691, the catalyst and process descriptions of each being expressly incorporated herein by reference. In general, these methods involve contacting the olefin product with a polyolefin-forming catalyst at a pressure and temperature effective to form the polyolefin product.

A preferred polyolefin-forming catalyst is a metallocene catalyst. The preferred temperature range of operation is between 50° C. and 240° C. and the reaction can be carried out at low, medium or high pressure, being anywhere from 1 bar to 200 bars. For processes carried out in solution, an inert diluent can be used, and the preferred operating pressure range is between 10 and 150 bars, with a preferred temperature between 120° C. and 230° C. For gas phase processes, it is preferred that the temperature generally be from 60° C. to 160° C., and that the operating pressure be from 5 bars to 50 bars.

In addition to polyolefins, numerous other olefin derivatives may be formed from the olefins produced by the process of the present invention or olefins recovered therefrom. These include, but are not limited to, aldehydes, alcohols, acetic acid, linear alpha olefins, vinyl acetate, ethylene dichloride and vinyl chloride, ethylbenzene, ethylene oxide, ethylene glycol, cumene, isopropyl alcohol, acrolein, allyl chloride, propylene oxide, acrylic acid, ethylene-propylene rubbers and acrylonitrile, and trimers and dimers of ethylene, propylene or butylenes. The methods of manufacturing these derivatives are well known in the art, and therefore are not discussed here.

Persons of ordinary skill in the art will recognize that many modifications may be made to the present invention without departing from the spirit and scope of the present invention. The embodiments described herein are meant to be illustrative only and should not be taken as limiting the invention, which is defined by the following claims.

The invention claimed is:

1. A process for regenerating catalyst, wherein the process comprises the steps of:
   (a) receiving a coked catalyst in a regeneration zone from a reactor;
   (b) contacting the coked catalyst with a regeneration medium in the regeneration zone at a first superficial velocity and under conditions effective to convert at least a portion of the coked catalyst to regenerated catalyst and forming gaseous products;
   (c) directing the gaseous products and entrained catalyst from the regeneration zone to a separation zone, wherein the entrained catalyst flows in the separation zone at a second superficial velocity;
   (d) separating a majority of the gaseous products in the separation zone from a majority of the entrained catalyst in the separation zone;
   (e) returning the majority of the entrained catalyst to the regeneration zone; and
   (f) directing the regenerated catalyst from the regeneration zone to the reactor, wherein the ratio of the first superficial velocity to the second superficial velocity is at least 1.2.

2. The process of claim 1, wherein the ratio is at least 2.0.

3. The process of claim 2, wherein the ratio is at least 3.0.

4. The process of claim 3, wherein the ratio is at least 4.0.

5. The process of claim 4, wherein the ratio is at least 5.3.

6. The process of claim 5, wherein the ratio is at least 6.8.

7. The process of claim 6, wherein the ratio is at least 8.5.

8. The process of claim 1, wherein the second superficial velocity is less than 1.0 meters per second.

9. The process of claim 8, wherein the second superficial velocity is less than 0.5 meters per second.

10. The process of claim 9, wherein the second superficial velocity is less than 0.25 meters per second.

11. The process of claim 10, wherein the second superficial velocity is less than 0.1 meters per second.

12. The process of claim 1, wherein the coked catalyst forms a dense bed in the regeneration zone, wherein the dense bed comprises from about 2 to about 45 volume percent of the regeneration zone, based on the total volume of the regeneration zone.

13. The process of claim 1, wherein the contacting of the coked catalyst with the regeneration medium in the regeneration zone occurs at a temperature of at least about 538° C.

14. The process of claim 13, wherein the temperature is at least 649° C.

15. The process of claim 14, wherein the temperature is at least 704° C.

16. The process of claim 1, wherein the reactor is a methanol-to-olefin reactor.

17. The process of claim 16, wherein the process further comprises the step of:
   (g) contacting methanol in the reactor with a molecular sieve catalyst under conditions effective to convert at least a portion of the methanol to light olefins and to form the coked catalyst.

18. The process of claim 17, wherein the molecular sieve catalyst is a partially-coked molecular sieve catalyst.

19. The process of claim 17, wherein the molecular sieve catalyst is selected from the group consisting of SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47, SAPO-56, the metal containing forms thereof, and mixtures thereof.

20. The process of claim 1, wherein the coked catalyst has a $d_{50}$ particle size from about 20 to about 200 microns.

21. The process of claim 1, wherein step (d) occurs in a cyclone separator situated within the separation zone.

22. A process for regenerating catalyst, wherein the process comprises the steps of:
   (a) receiving a coked catalyst in a regeneration zone from a reactor;
   (b) contacting the coked catalyst with a regeneration medium in the regeneration zone at a first superficial velocity and under conditions effective to convert at least a portion of the coked catalyst to regenerated catalyst and forming gaseous products;
   (c) directing the gaseous products and entrained catalyst from the regeneration zone to a separation zone, wherein the entrained catalyst flows in the separation zone at a second superficial velocity, the second superficial velocity being less than the first superficial velocity;
   (d) separating a majority of the gaseous products in the separation zone from a majority of the entrained catalyst in the separation zone;
   (e) returning the majority of the entrained catalyst to the regeneration zone;
   (f) releasing a flue gas stream comprising the majority of the gaseous products from the separation zone, wherein the flue gas stream contains less than about 0.5 weight percent entrained catalyst, based on the total weight of the flue gas stream; and
   (g) directing the regenerated catalyst from the regeneration zone to the reactor.

23. The process of claim 22, wherein the flue gas stream contains less than 0.05 weight percent entrained catalyst, based on the total weight of the flue gas stream.

24. The process of claim 23, wherein the flue gas stream contains less than 0.005 weight percent entrained catalyst, based on the total weight of the flue gas stream.

25. The process of claim 22, wherein the ratio of the first superficial velocity to the second superficial velocity is at least 1.2.

26. The process of claim 25, wherein the ratio of the first superficial velocity to the second superficial velocity is at least 2.0.

27. The process of claim 26, wherein the ratio of the first superficial velocity to the second superficial velocity is at least 3.0.

28. The process of claim 27, wherein the ratio of the first superficial velocity to the second superficial velocity is at least 4.0.

29. The process of claim 28, wherein the ratio of the first superficial velocity to the second superficial velocity is at least 5.3.

30. The process of claim 29, wherein the ratio of the first superficial velocity to the second superficial velocity is at least 6.8.

31. The process of claim 30, wherein the ratio of the first superficial velocity to the second superficial velocity is at least 8.5.

32. The process of claim 22, wherein the second superficial velocity is less than about 1.0 meters per second.

33. The process of claim 32, wherein the second superficial velocity is less than 0.5 meters per second.

34. The process of claim 33, wherein the second superficial velocity is less than 0.25 meters per second.

35. The process of claim 34, wherein the second superficial velocity is less than 0.1 meters per second.

36. The process of claim 22, wherein the coked catalyst forms a dense bed in the regeneration zone, wherein the dense bed comprises from about 2 to about 45 volume percent of the regeneration zone, based on the total volume of the regeneration zone.

37. The process of claim 22, wherein the contacting of the coked catalyst with the regeneration medium in the regeneration zone occurs at a temperature of at least about 538° C.

38. The process of claim 37, wherein the temperature is at least 649° C.

39. The process of claim 38, wherein the temperature is at least 704° C.

40. The process of claim 22, wherein the reactor is a methanol-to-olefin reactor.

41. The process of claim 40, wherein the process further comprises the step of:

(h) contacting methanol in the reactor with a molecular sieve catalyst under conditions effective to convert at least a portion of the methanol to light olefins and to form the coked catalyst.

42. The process of claim 41, wherein the molecular sieve catalyst is a partially-coked molecular sieve catalyst.

43. The process of claim 41, wherein the molecular sieve catalyst is selected from the group consisting of SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47, SAPO-56, the metal containing forms thereof, and mixtures thereof.

44. The process of claim 22, wherein the coked catalyst has a $d_{50}$ particle size from about 20 to about 200 microns.

45. The process of claim 22, wherein step (d) occurs in a cyclone separator situated within the separation zone.

* * * * *

(12) INTER PARTES REEXAMINATION CERTIFICATE (666th)
United States Patent
Beech, Jr. et al.

(10) Number: US 7,214,636 C1
(45) Certificate Issued: Aug. 14, 2013

(54) CATALYST REGENERATOR FOR REDUCING ENTRAINED CATALYST LOSS

(75) Inventors: James Harding Beech, Jr., Kingwood, TX (US); Richard E. Walter, Long Valley, NJ (US)

(73) Assignee: ExxonMobil Chemical Patents Inc., Houston, TX (US)

Reexamination Request:
No. 95/001,400, Jul. 20, 2010

Reexamination Certificate for:
Patent No.: 7,214,636
Issued: May 8, 2007
Appl. No.: 10/646,240
Filed: Aug. 22, 2003

(51) Int. Cl.
*B01J 20/34* (2006.01)

(52) U.S. Cl.
USPC .......................................................... 502/38

(58) Field of Classification Search
USPC .......................................................... 502/38
See application file for complete search history.

(56) References Cited

To view the complete listing of prior art documents cited during the proceeding for Reexamination Control Number 95/001,400, please refer to the USPTO's public Patent Application Information Retrieval (PAIR) system under the Display References tab.

*Primary Examiner* — Jerry D Johnson

(57) ABSTRACT

The present invention is directed to a swaged catalyst regenerator and processes for using the catalyst regenerator. In one embodiment, the swaged catalyst regenerator includes a regeneration zone having a first major diameter and into which a regeneration medium and an at least partially coked catalyst from a reactor can be fed. The catalyst regenerator also includes a separation zone having a second major diameter. The separation zone is provided to separate entrained catalyst from gaseous components, e.g., combustion products of a regeneration process, and return the entrained catalyst to the regeneration zone. The ratio of the second major diameter to the first major diameter is at least 1.1, 1.4, 1.7, 2.0, 2.3, 2.6 or 2.9. By providing a catalyst regenerator having these characteristics, desirable regeneration characteristics that minimize entrained catalyst loss can be achieved.

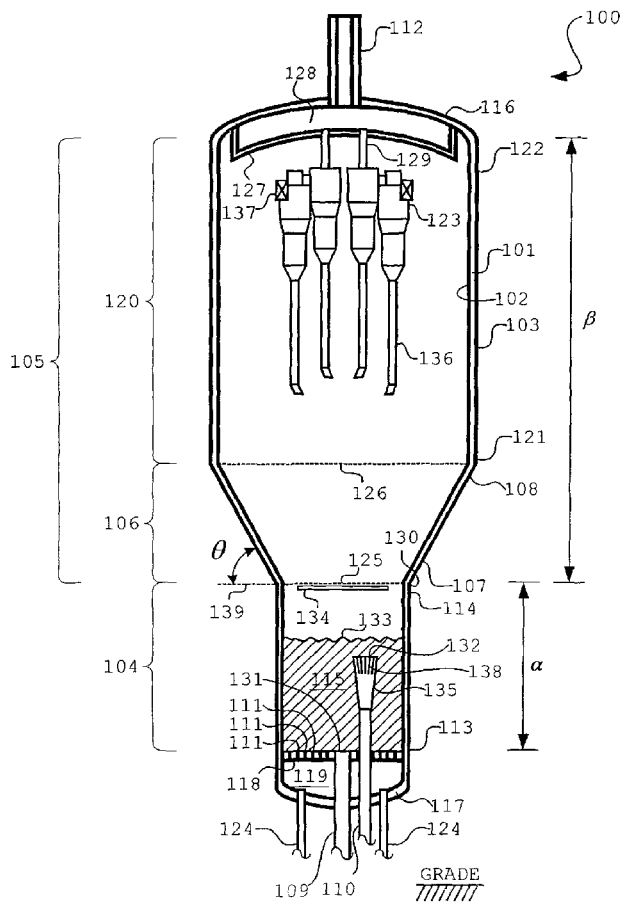

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-45 are cancelled.

\* \* \* \* \*